United States Patent [19]
Kamo

[11] Patent Number: 5,978,159
[45] Date of Patent: Nov. 2, 1999

[54] HYBRID PHOTOGRAPHIC OBJECTIVE

[75] Inventor: Yuji Kamo, Hino, Japan

[73] Assignee: Olympus Optical Co., Ltd., Tokyo, Japan

[21] Appl. No.: 08/982,415

[22] Filed: Dec. 2, 1997

[30] Foreign Application Priority Data

Dec. 2, 1996 [JP] Japan ................................. 8-321307

[51] Int. Cl.$^6$ .............................. G02B 9/04; G02B 5/18
[52] U.S. Cl. ........................... 359/793; 359/570; 359/576
[58] Field of Search .................................. 359/563, 564, 359/566, 570, 571, 576, 708, 724, 736, 737; 396/6

[56] References Cited

U.S. PATENT DOCUMENTS

| 5,680,252 | 10/1997 | Sitter et al. | 359/566 |
| 5,970,321 | 8/1998 | Goto | 359/742 |

FOREIGN PATENT DOCUMENTS

| 4-181908 | 6/1992 | Japan . |
| 6-324262 | 11/1994 | Japan . |
| 6-331887 | 12/1994 | Japan . |
| 95/18393 | 7/1995 | WIPO . |
| 96/17265 | 6/1996 | WIPO . |

*Primary Examiner*—Georgia Epps
*Assistant Examiner*—David N. Spector
*Attorney, Agent, or Firm*—Pillsbury Madison & Sutro, LLP

[57] ABSTRACT

The invention provides a high-performance yet low-cost phototaking optical system using a diffractive optical element. The optical system comprises, in order from an object side thereof, a first positive lens in a meniscus form convex toward the object side, an aperture stop, and a second positive lens in a double-convex form, with a diffractive surface formed on the object side of the first lens. The system comprising an aperture stop, at least two lenses and at least one diffractive surface satisfies the condition $0<d_{DOE}/f<0.24$ where f is a focal length of the overall system and $d_{DOE}$ is a distance on an optical axis thereof from the aperture stop to the diffractive surface. This condition is provided to locate the diffractive surface in the vicinity of the aperture stop to lower ray height, thereby placing chromatic aberration in a well-balanced state.

25 Claims, 19 Drawing Sheets

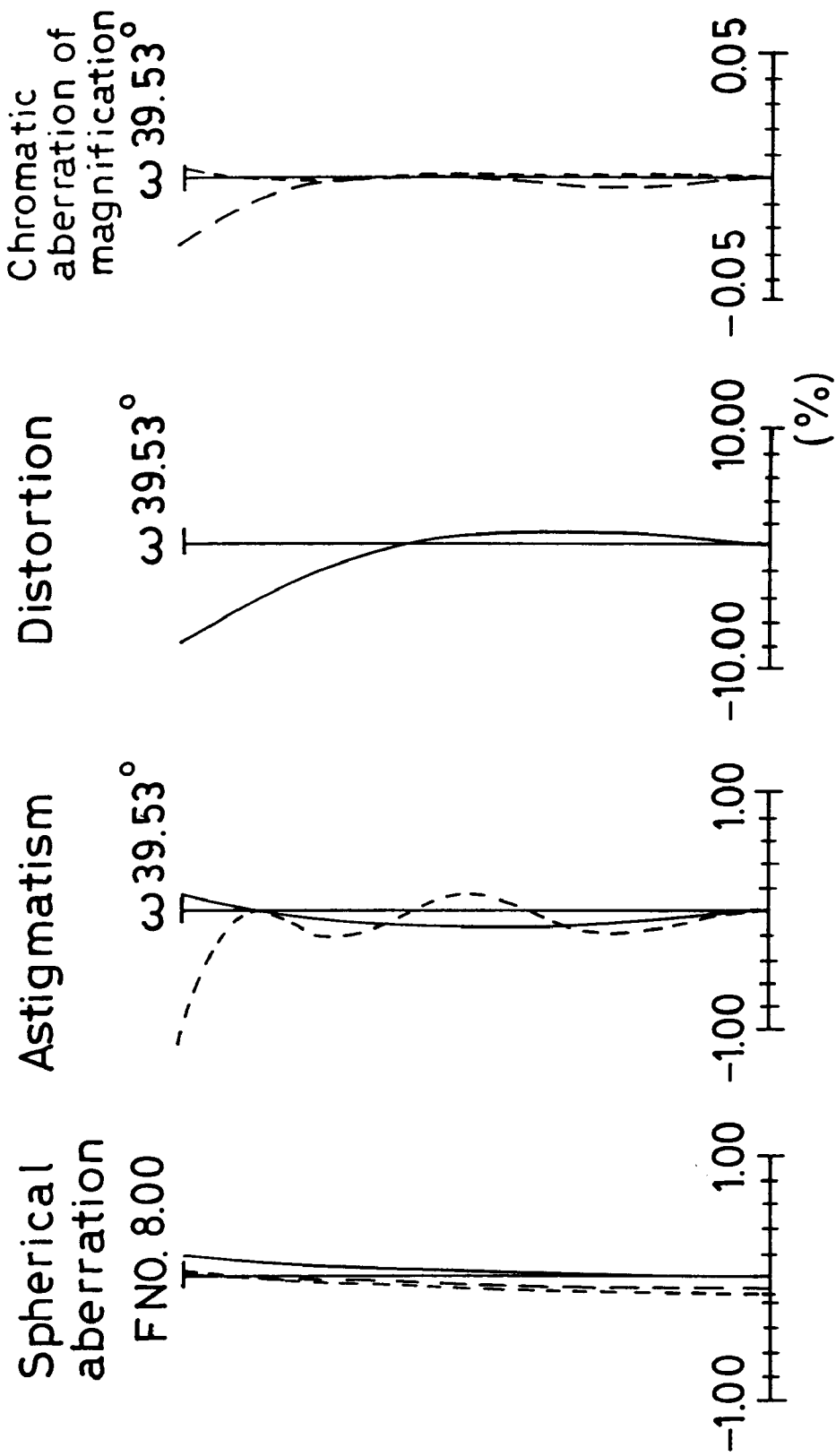

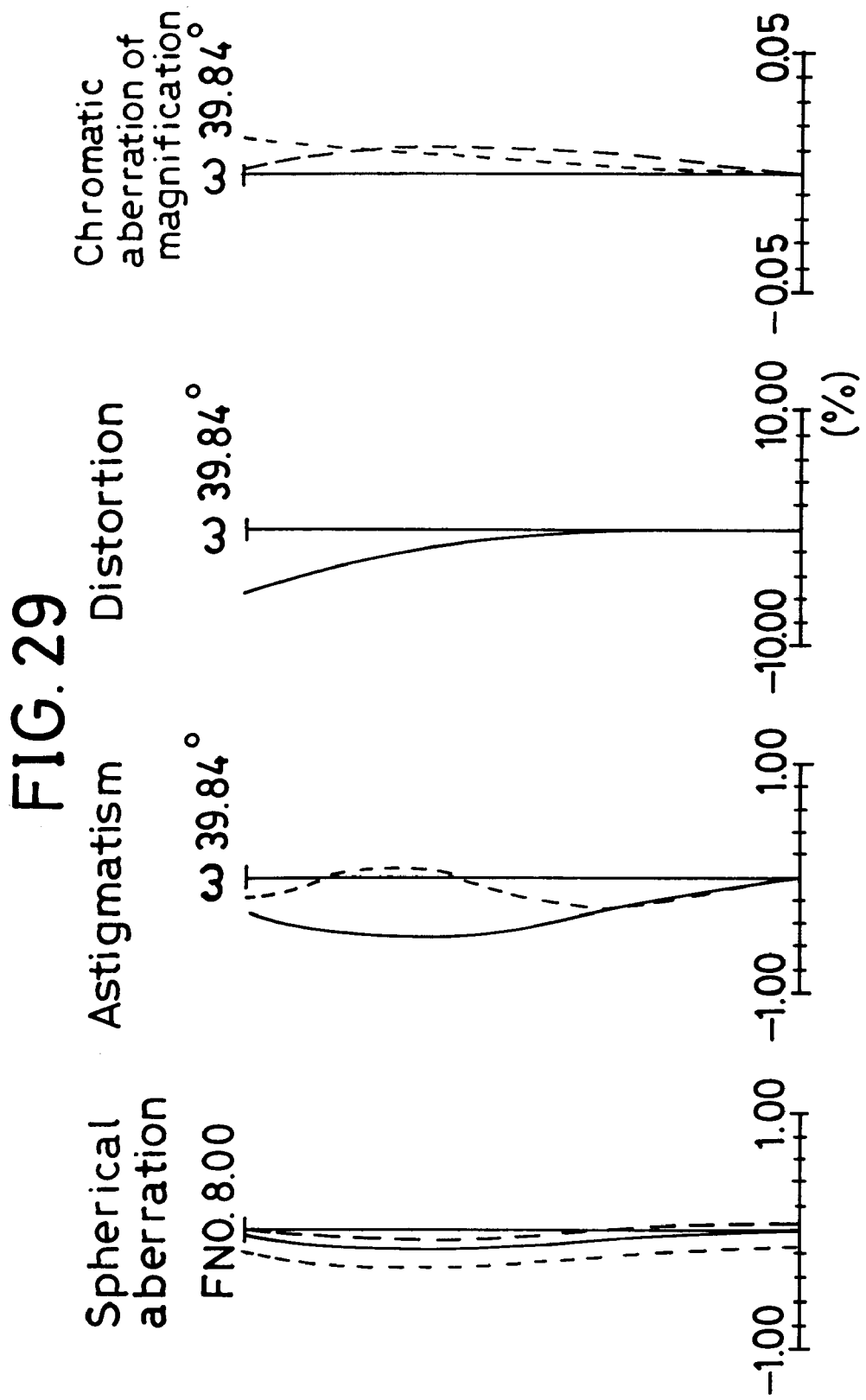

HYBRID PHOTOGRAPHIC OBJECTIVE

BACKGROUND OF THE INVENTION

1. Field of the Invention

The present invention relates to a phototaking optical system using a diffractive optical element (DOE for short). More particularly, this invention is directed to a phototaking optical system designed for use on cameras such as silver halide or electronic cameras.

2. Discussion of Related Art

For phototaking optical systems designed for use on silver halide or electronic cameras, it has so far been proposed to improve their performance and cut down their cost. In regard to a general phototaking optical system, it is difficult to achieve cost reductions because many lenses are needed for achieving high performance by correcting aberrations. In recent years, therefore, cost reductions have been accomplished by reducing the number of lenses while keeping performance acceptable by the use of aspheric surfaces. However, aspheric surfaces have a grave disadvantage of being incapable of correcting for chromatic aberrations although they may correct monochromatic aberrations such as spherical aberrations, and coma. Therefore, an extreme reduction in the number of lenses for the purpose of achieving cost reductions often results in performance loss because chromatic aberrations become worse. To correct chromatic aberrations, there is thus no choice but to use suitable combinations of lenses of varying powers, but this inevitably incurs an increase in the number of lenses. That is, it is difficult to arrive at a sensible tradeoff between high performance and low cost.

Attention is now directed to a diffractive optical element (or DOE) having diffractive action to bend light rays. Unlike a general vitreous material, the DOE is characterized by having reciprocal dispersion, i.e., an Abbe number of –3.45, so that achromatization is achievable by a combination of positive power and positive power, unlike a conventional refractive system. Such a characteristic feature is believed to enable the DOE to be used with a phototaking optical system.

An account is here given of a DOE in general. The DOE is interpreted at great length in "Optics", Vol. 22, pp. 635–642, and pp. 730–737, for instance.

A conventional lens is based on refracting action at an interface of the medium, whereas the DOE is based on the diffraction of light. Now assume that light is incident on such a diffraction grating as depicted in FIG. 1. In general, the light leaving the grating upon diffraction then satisfies the following relation:

$$\sin\theta - \sin\theta' = m\lambda/d \quad (a)$$

where $\theta$ is the angle of incidence, $\theta'$ is the exit angle, $\lambda$ is the wavelength of light, d is the pitch of the diffraction grating, and m is the order of diffraction.

Therefore, if a ring form of diffraction grating is designed to have a proper pitch according to equation (a), it is then possible to focus light upon one point. In other words, the diffraction grating is allowed to have lens action. Here, let $r_j$ and f represent the radius of a j-th grating ring and the focal length of a diffractive surface, respectively. If an optical path difference between a light ray diffracted by the j-th grating and a light ray passing through the center of the diffraction grating is designed to be integral multiples of wavelength, both light rays interact with each other to increase their intensity. That is, the following relation holds:

$$\sqrt{(r_j^2 + f^2)} - f = j\lambda \quad (b\text{-}1)$$

Also, if $r_j$ is not very large with respect to the focal length, the radius $r_j$ of the grating ring is then given by $$r_j = \sqrt{(2j\lambda f)} \quad (b\text{-}2)$$

For the diffraction grating, several types are proposed, for instance, an amplitude modulation type made up of a bright-and-dark ring, and a phase modulation type with a variable refractive index or optical path length. In the amplitude type DOE, the ratio between the quantity of incident light and the quantity of light subject to first-order diffraction (hereinafter called diffraction efficiency), for instance, is at most about 6% because light of plural orders of diffraction is generated. The amplitude modulation type DOE, even when bleached or otherwise treated for diffraction efficiency improvements, has a diffraction efficiency of at most about 34%. However, the same phase modulation type DOE, if it is of a saw-toothed shape in section as depicted in FIG. 2, can have a diffraction efficiency increased to 100%. Such a DOE is called a kinoform. Here the height of each sawtooth is given by $$h = m\lambda/(n-1) \quad (c)$$

where h is the height of the sawtooth, m is the order of diffraction (hereinafter called the design order of diffraction), and n is the index of refraction of an optical member forming the diffractive surface.

As can be expected from equation (c) depending on wavelength, however, the diffraction efficiency of 100% is achievable for only one wavelength. Thus, the diffraction efficiency $D_M(\lambda)$ depends on wavelength, and so is given by:

$$D_M(\lambda) = \mathrm{sinc}^2[\pi\{M - m\{(1-n)/(1-n_{DOE})\}(\lambda_{DOE}/\lambda)\}] \quad (d)$$

where M is the order of diffraction at which the DOE is used, m is the design order of diffraction, $\lambda$ is the wavelength at which the DOE is used, $\lambda_{DOE}$ is the design wavelength, and n and $n_{DOE}$ are the indices of refraction of an optical member forming the diffractive surface at the wavelengths $\lambda$ and $\lambda_{DOE}$.

A kinoform element, if it is to step approximation as depicted in FIG. 3, is often called a binary optical element, and can be relatively easily fabricated by lithographic techniques. The binary optical element is known to have a diffraction efficiency of 81%, 95%, and 99% according to 4-, 8-, and 16-step approximation, respectively.

Examples of such a DOE applied to phototaking optical systems are disclosed in the following publications.

WO95/18393 shows a phototaking optical system comprising a single lens and a diffractive surface for making correction for aberrations. JP-A 4-181908 discloses an easy-to-manufacture radial type inhomogeneous lens wherein the chromatic aberrations produced are set off and corrected by a diffractive lens. This inhomogeneous lens is made up of one to three lens elements. JP-A's 6-324262 and 6-331887 teach that a diffractive surface is formed on front lenses of telescopic systems to make correction for chromatic aberrations. The former system is made up of six lens elements, and the latter system is made up of 10 or 11 lens elements.

However, all these phototaking optical systems using DOEs are found to be still less than satisfactory in terms of performance and cost. The system disclosed in WO95/18393 is somewhat more inexpensive because of being a single lens, but its performance is insufficient because coma, and other aberrations remain under-corrected.

The system set forth in JP-A 4-181908 achieves high performance albeit being composed of a reduced number of lens elements. However, this system actually costs much because it uses an inhomogeneous lens. Inhomogeneous lenses are still unsuitable for mass production of cameras, etc., and so are unfavorable.

The systems set forth in JP-A's 6-324262 and 6-331887 achieve high performance by using DOEs for lenses in telescopic systems. However, these systems fail to take full advantage of DOEs because the DOEs are used only for the purpose of making fine correction for chromatic aberrations.

Thus, all these prior art arrangements fail to make a reasonable compromise between low cost and high performance.

SUMMARY OF THE INVENTION

In view of such problems associated with the prior art, it is an object of the present invention to provide a high-performance yet inexpensive phototaking optical system making use of a diffractive optical element.

According to the first aspect of the invention, there is provided a phototaking optical system making use of a diffractive optical element, which comprises an aperture stop, at least two lenses, and at least one diffractive surface, and satisfies the following condition (1):

$$0 < d_{DOE}/f < 0.24 \quad (1)$$

Here f is a focal length of the overall phototaking optical system, and $d_{DOE}$ is a distance on an optical axis of the phototaking optical system from the aperture stop to the diffractive surface.

According to the second aspect of the invention, there is provided a phototaking optical system making use of a diffractive optical element, which comprises an aperture stop, two lenses, and one diffractive surface.

According to the third aspect of the invention, there is provided a phototaking optical system making use of a diffractive optical element, which comprises an aperture stop, two lenses, positive and positive, in order from an object side of the phototaking optical system, and at least one diffractive surface, all being formed of a homogeneous medium.

According to the fourth aspect of the invention, there is provided a phototaking optical system making use of a diffractive optical element, which comprises an aperture stop, two lenses, positive and positive, in order from an object side of the phototaking optical system, and at least one diffractive surface, and satisfies the following condition (3):

$$-1 < SF_1 < 0.15 \quad (3)$$

Here $SF_1 = (r_A - r_B)/(r_A + r_B)$ where $r_A$ is a radius of curvature of a surface of the first lens that faces the object side, and $r_B$ is a radius of curvature of a surface of the first lens that faces an image side of the phototaking optical system.

According to the fifth aspect of the invention, there is provided a phototaking optical system making use of a diffractive optical element, which comprises an aperture stop, two lenses, positive and negative, in order from an object side of the phototaking optical system, and at least one diffractive surface.

According to the sixth aspect of the invention, there is provided a phototaking optical system making use of a diffractive optical element, which comprises an aperture stop, two lenses, negative and positive, in order from an object side of the phototaking optical system, and at least one diffractive surface.

The first to sixth aspects of the phototaking optical system according to the present invention are now explained with the features and advantages thereof.

BRIEF DESCRIPTION OF THE DRAWINGS

FIG. 28 is a similar aberration diagram for Example 14.

FIG. 29 is a similar aberration diagram for Example 15.

DESCRIPTION OF THE PREFERRED EMBODIMENTS

Figure 1:
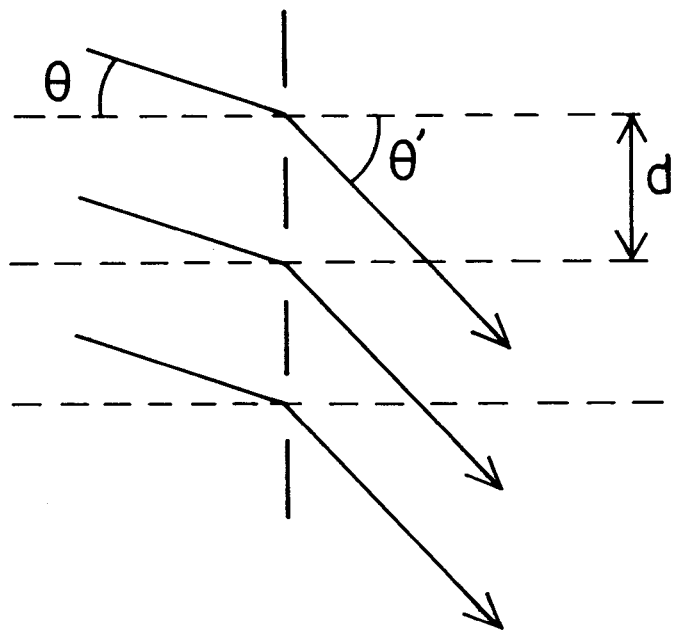
FIG. 1 illustrates the diffractive action of a diffraction grating.

First of all, the conditions required for the accomplishment of the object of the invention are explained in conjunction with all the first to sixth aspects of the invention. So far, it has been proposed to use a one-lens system as a low-cost lens system. As the number of lenses comes down to one, however, the degree of freedom of design becomes very low because the power is determined by the lens specification alone and so there is no choice but to make a selection from bending shapes for the purpose of making correction of aberrations. With the one-lens system, therefore, it is structurally impossible to make correction for chromatic aberration of magnification and Petzval's sum. Even when such a one-lens system is used in combination with an aspheric surface, aberrations such as distortion and coma remain under-corrected. Thus, the one-lens system is inexpensive but has difficulty in achieving high performance.

If the system is made up of at least two lenses, it is then possible to make the degree of freedom of design so high that a sensible selection can be made from lens power profiles, aperture stop positions, and so on. It is thus possible to make good correction for the aforesaid aberrations that cannot be corrected by the one-lens system. To achieve a low-cost yet high-performance lens system, therefore, it is required to construct the system of at least two lenses.

It has been found, however, that the system, even when made up of two lenses, is still insufficient insofar as the correction of chromatic aberrations is concerned. The diffractive surface of a diffractive optical element, or DOE, on the other hand, has a reciprocal dispersion or Abbe number of −3.45. Therefore, if this diffractive surface is used for a refractive surface of a lens, it is then possible to make correction for chromatic aberrations without recourse to an additional lens. According to the invention, it is thus possible to achieve low cost and high performance by proper use of the DOE, as described below.

The first aspect of the invention as well as the features and advantages thereof are explained. With reference here to the effect of the DOE on the correction of aberrations, the DOE has very high dispersion; chromatic aberrations produced at the DOE increase with an increase in its power, resulting in performance loss. To make correction for chromatic aberrations in a well-balanced state, it is required to relatively decrease the power of the DOE.

Even when the DOE is used in this manner, however, there is often a deterioration of chromatic aberration of magnification. The effect of the DOE on the correction of chromatic aberration of magnification varies with not only power but also ray height. When the DOE having very large dispersion is placed at a position of considerable ray height, therefore, the chromatic aberration of magnification is over-corrected. This is a leading cause of the deterioration of chromatic aberration of magnification. In the practice of the invention, therefore, the diffractive surface is located in the vicinity of the aperture stop to lower ray height, thereby placing the chromatic aberration of magnification in a well-balanced state.

It is thus preferred that the position of the diffractive surface satisfies the following condition (1):

$$0 < d_{DOE}/f < 0.24 \tag{1}$$

Here f is a focal length of the overall phototaking optical system and $d_{DOE}$ is a distance on an optical axis of the system from the aperture stop to the diffractive surface.

When the upper limit of 0.24 in condition (1) is exceeded, chromatic aberration of magnification produced at the diffractive surface becomes too large to be balanced against longitudinal chromatic aberration. At the lower limit of 0 the DOE interferes physically with the aperture stop.

To meet high-performance and low-cost requirements at the same time, it is desired for the position of the DOE to satisfy the following condition (2):

$$0.02 < d_{DOE}/f < 0.21 \tag{2}$$

The second aspect of the phototaking optical system according to the invention is then explained together with the features and advantages thereof.

Figure 4:
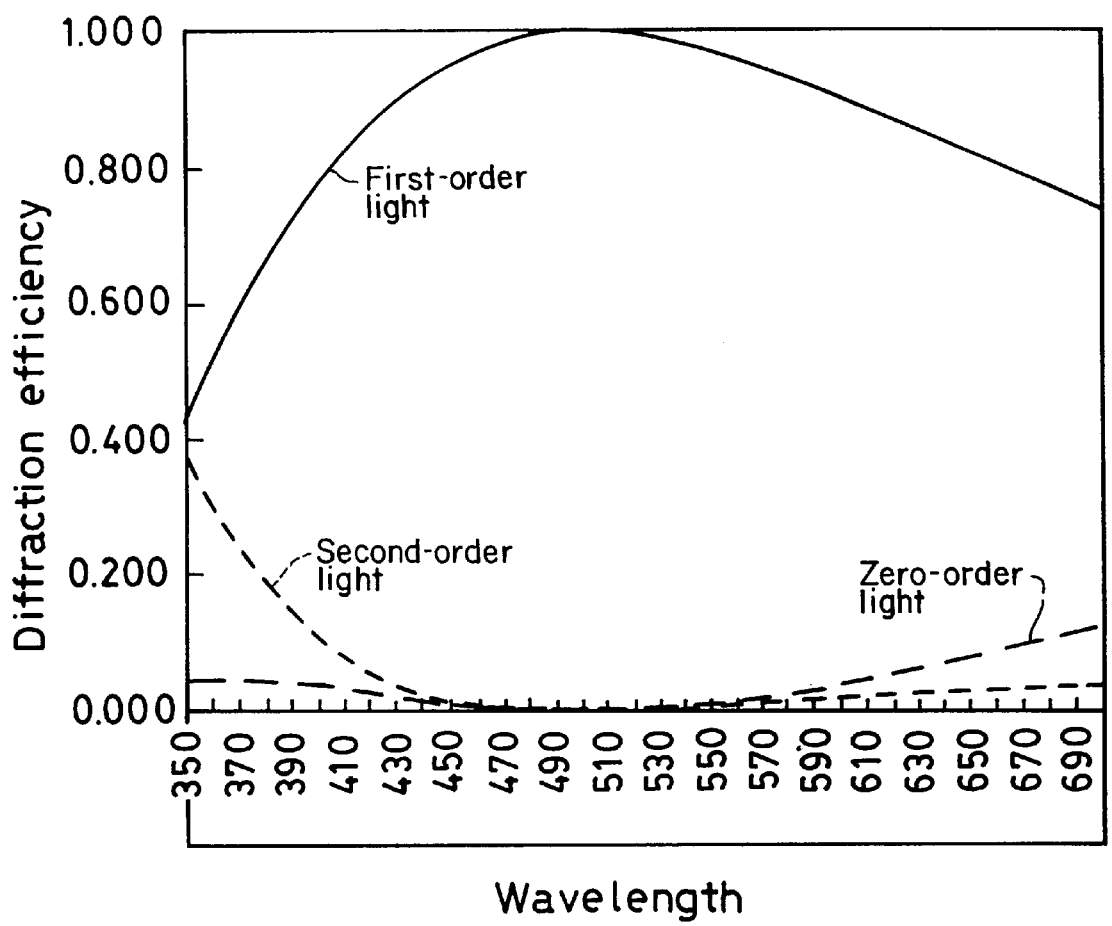
FIG. 4 is a schematic representation showing the relation between wavelength and diffraction efficiency at a design order of 1 and a design wavelength of 500 nm.

First, a problem concerning unnecessary orders of light produced at a DOE is explained. The DOE is characterized by having a diffraction efficiency of 100% with respect to a specific wavelength alone, as can be seen from equation (c) regarding the prior art. Upon incidence on the DOE of a light ray whose wavelength is different from that wavelength, therefore, the design or m-th order diffraction efficiency drops. This in turn causes other orders of (e.g., m+1-th, and m−1-th) diffraction efficiencies to increase, resulting in the occurrence of unnecessary light. In this connection, diffraction efficiency changes at 350 nm to 700 nm wavelengths are illustrated in FIG. 4 on condition that the design order is 1 and the design wavelength is 500 nm. FIG. 4 shows that when the DOE is used in conjunction with white light, unnecessary light such as zero-order light and second-order light is produced and image quality is often adversely affected by such unnecessary light. Thus, even when aberration performance is improved by use of many DOEs, there is an image quality drop due to large influences of the unnecessary orders of light.

The placement of one diffractive surface is sufficient for the correction of chromatic aberrations. In other words, when a plurality of diffractive surfaces are used, the chromatic aberrations are over-corrected; chromatic aberrations produced at one diffractive surface must be corrected by another diffractive surface. In addition, an eccentricity of such diffractive surfaces, which may be caused by assembling, etc., leads possibly to performance loss.

To achieve the object of the present invention, therefore, it is desired that at least one diffractive surface be used in conjunction witn a lens arrangement consisting of two lenses.

The third aspect of the phototaking optical system according to the present invention is explained together with the features and advantages thereof.

The optimum arrangement of two lenses of positive power and positive power in the third, and fourth aspects of the photo-taking optical system according to the present invention is described just below.

In a conventional system comprising two lenses each having positive power, the curvature of each lens is not very strong because the positive power is divided into halves with respect to the focal length of the overall system. For this reason, the amount of higher-order aberrations produced is so small that monochromatic aberrations such as spherical aberration and coma are in a generally good state. For this lens system comprising positive lenses alone, however, there is no choice but to reduce the amount of aberrations produced at the individual lenses so as to reduce longitudinal chromatic aberration, but it is in principle impossible to reduce them to zero. Thus, this system is less than satisfactory in terms of performance.

By using at least one diffractive surface in conjunction with a lens arrangement consisting of two lenses and having a positive-positive power profile according to the present invention, it is possible to make effective correction for chromatic aberrations and, hence, improve performance.

Incidentally, it is expected that, in view of performance improvements, inhomogeneous medium lenses are preferable to homogeneous medium lenses because not only chromatic aberrations but also monochromatic aberrations such as coma can be corrected. However, inhomogeneous lenses are much higher in cost than homogeneous lenses, and so are not suitable for use on cameras, etc. because cost reductions are hardly achievable even though the number of inhomogeneous lenses used is reduced. In addition, the quality control, and manufacture of inhomogeneous lenses are more difficult than those of homogeneous lenses, and so the inhomogeneous lenses are not suitable for application to mass-produced cameras, etc. Thus, the inhomogeneous medium lenses may be favorable for performance improvements, but are generally more unfavorable than the homogeneous medium because grave problems arise in connection with cost, and productivity.

To accomplish the object of the present invention, therefore, it is desired that the diffractive surface be used in conjunction with two lenses each having positive power.

The fourth aspect of the phototaking optical system according to the present invention is described together with the features and advantages thereof.

When the lens system is constructed of only two lenses, it is often difficult to correct large aberrations produced at one lens with another lens. It is thus required that the amount of aberrations produced at the individual lenses be reduced as much as possible. Especially with a lens system having a positive-positive power profile, it is difficult to correct the second lens for spherical aberration and coma because a light beam passing through the second lens is more slender than that passing through the first lens. It is thus required that the amount of aberrations produced at the first lens be reduced as much as possible. This is achieved by allowing the first lens to have a shape convex toward the object side of the system, so that the aforesaid aberrations can be well corrected with considerable distortion and astigmatism reductions.

Accordingly, it is preferable for the first lens to satisfy the following condition (3):

$$-1 < SF_1 < 0.15 \quad (3)$$

Here $SF_1=(r_A-r_B)/(r_A+r_B)$ where $r_A$ is a radius of curvature of the first lens that faces the object side of the system, and $r_B$ is a radius of curvature of the first lens that faces the image side of the system.

Condition (3) defines the shape factor of the first lens. When the upper limit of 0.15 is exceeded, the effect of the first lens on the correction of aberrations becomes slender due to its positive power decrease. When the lower limit of $-1$ is not reached, aberrations such as coma become worse with performance loss because the convexity of the first lens toward the object side of the system vanishes.

To achieve ever-higher performance, it is preferable for the first lens to satisfy the following condition (4):

$$-0.5 < SF_1 < 0.08 \quad (4)$$

For the second to fourth phototaking optical system embodiments, it is noted that their Petzval's sum cannot be reduced to a sufficient level because they are composed only of positive lenses, and so their peripheral performance becomes worse due to field of curvature. However, this is avoided by allowing the image plane to have a cylindrical shape whose major or minor side has a given curvature, thereby making the influence of field of curvature less.

The fifth aspect of the phototaking optical system according to the present invention is explained together with the features and advantages thereof.

The system constructed of two positive lenses each having positive power has a demerit of being incapable of reducing the Petzval's sum to a sufficient level because it is composed only of positive lenses. For this reason, the field of curvature increases, offering a certain problem in connection with the peripheral performance. In addition, some limitation is in principle placed on an overall length reduction because the principal point is positioned in the vicinity of the center of the system.

If the system is constructed of two lenses, positive and negative, in order from the object side thereof, it is then possible to make correction for the Petzval's sum, and reduce the overall length of the system because the principal point is shifted toward the object side of the system. With an arrangement consisting of two lenses and having a positive-negative power profile, it is impossible to achieve a power profile best suited for the correction of chromatic aberrations and so make sufficient correction therefor. This is because if the power of the arrangement is too strong, spherical aberration and coma then become worse.

By using at least one diffractive surface in conjunction with the arrangement having a positive-negative power profile according to the present invention, it is possible to make effective correction for chromatic aberrations and so improve performance.

Such a system is better in performance than a conventional lens system, and enables a camera to be made more compact because its overall length can be reduced.

To achieve the object of the present invention, therefore, it is preferable that at least one diffractive surface is used in conjunction with the arrangement consisting of a lens of positive power and a lens of negative power in order from the object side of the system.

The sixth aspect of the phototaking optical system according to the present invention is explained together with the features and advantages thereof.

An arrangement consisting of two lenses and having a negative-positive power profile is described with reference to the sixth aspect of the phototaking optical system according to the present invention. With the arrangement having a positive-positive power profile, the field of curvature increases under the influence of the Petzval's sum, offering a certain problem in connection with the peripheral performance, as previously stated. In addition, since the principal point is positioned in the vicinity of the center of the arrangement, it is often impossible to ensure a sufficient back focus when the focal length of the system is short.

If the arrangement is constructed of two lenses, negative and positive, in order from the object side of the system, it is then possible to make correction for the Petzval's sum. In addition, the principal point is shifted toward the image side of the system in such a manner as to make sure of the back focus. With a conventional arrangement consisting of two lenses of negative power and positive power, however, it is impossible to achieve a power profile best suited for the correction of chromatic aberrations and hence make sufficient correction therefor. This is because when the power of the arrangement is too strong, spherical aberration and coma become worse.

By using at least one diffractive surface in conjunction with an arrangement consisting of two lenses and having a negative-positive power profile according to the present invention, it is possible to make effective correction for chromatic aberrations and so improve performance.

Such a system is better in performance than a conventional lens system, and can physically make sure of a back focus when applied to an optical system having a reduced focal length, for instance, a wide-angle lens system or an optical system having a small image size, e.g., a lens for monitor cameras.

To achieve the object of the present invention, therefore, it is preferable that at least one diffractive surface is used in conjunction with an arrangement consisting of two lenses of negative power and positive power in order from the object side of the system.

For the fifth, and sixth phototaking optical system embodiments where one of the two lenses is a negative lens, it is required that the power of the positive lens is increased so as to make sure of the power of the overall system. It is noted, however, that the correction of chromatic aberrations and Petzval's sum, the overall length reduction of the system, etc. cause the power of the system to become strong, resulting in performance loss due to increases in the amount of aberrations produced at the individual lens surfaces. It is thus desired that, in addition to at least one diffractive surface, at least one aspheric surface be used in conjunction with the lens arrangement so that the aberrations can be well corrected.

For the fifth, and sixth phototaking optical system embodiments, it is desired that the negative lens satisfy the following condition (5):

$$-1.2 < f/f_{NEG} < -0.05 \qquad (5)$$

Here f is a focal length of the overall phototaking optical system and $f_{NEG}$ is a focal length of the negative lens.

Condition (5) gives a definition of the power of the negative lens. When the upper limit of −0.05 is exceeded, the power of the negative lens becomes too weak to have an effect on the correction of chromatic aberrations and Petzval's sum, and below the lower limit of −1.2, the power of the negative lens becomes too strong to make correction for coma and astigmatism even when used in combination with the aspheric surface.

To achieve ever-higher performance, it is desirable for the negative lens to satisfy the following condition (6):

$$-0.9 < f/f_{NEG} < -0.15 \qquad (6)$$

With reference here to the second, third, fourth, fifth, and sixth phototaking optical system embodiments, where to locate the aperture stop is explained. In a conventional arrangement consisting of two lenses, some severe limitation is placed on where to locate an aperture stop for the purpose of making sure of performance, because it is impossible to make sufficient correction for chromatic aberration of magnification. By use of a DOE, however, it is possible to make the degree of freedom regarding where to locate the aperture stop higher than would be possible in the art because it is possible to make good correction for chromatic aberration of magnification.

Especially if the aperture stop is positioned on the object or image side of the system, a lens member can be positioned irrespective of a space allowed for lenses, and so can be mounted within a camera with a high degree of design.

The placement of the aperture stop between two lenses is favorable for the correction of coma because upper and lower portions of marginal rays can be cut off by the barrel of lenses, etc.

In the first, and second phototaking optical system embodiments, two lenses each of positive power may be used. By doing so, spherical aberration and coma are kept in good condition and monochromatic aberrations are maintained in generally good condition as well, as previously explained with reference to the third, and fourth phototaking optical system embodiment.

In the first, and second phototaking optical system embodiment, two lenses of negative power, and positive power may be used. By doing so, it is possible to eliminate the problem regarding the Petzval's sum, as previously explained in connection with the sixth phototaking optical system embodiment. This also enables even a lens system having a short focal length to readily make sure of the back focus.

In the first, third, fourth, fifth, and sixth phototaking optical system embodiments, only one diffractive surface may be used. By doing so, the problem regarding the unnecessary order of light may be solved to some extent and so any image quality drop may be avoided, as previously explained with reference to the second phototaking optical system embodiment.

In the first, second, fourth, fifth, and sixth phototaking optical system embodiments, all the lenses may be formed of a homogeneous medium. By doing so, the problems regarding cost and productivity may be settled to some extent, as previously explained with reference to the third phototaking optical system embodiment.

Figure 5:
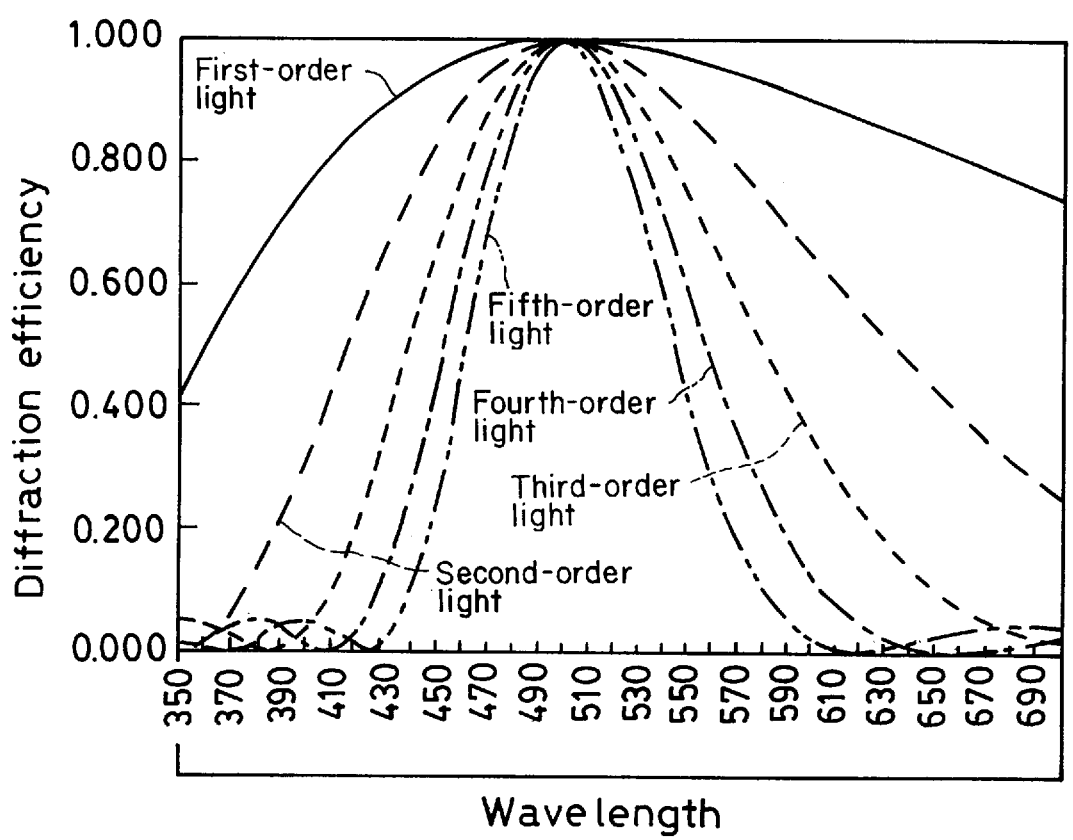
FIG. 5 is a schematic representation illustrative of a diffraction efficiency change at design orders of 1 to 5.
Figure 6:
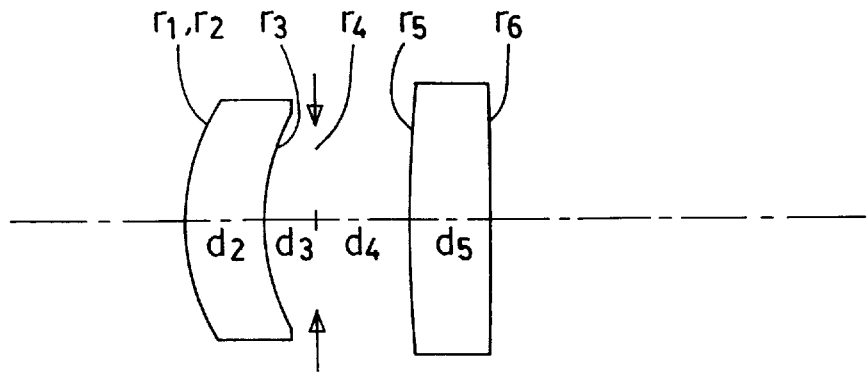
FIG. 6 is a sectional schematic of Example 1 inclusive of an optical axis thereof.
Figure 7:
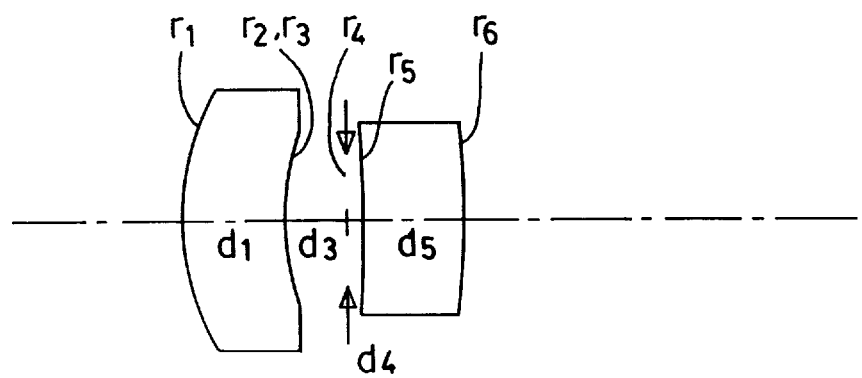
FIG. 7 is a sectional schematic of Example 2 inclusive of an optical axis thereof.
Figure 8:
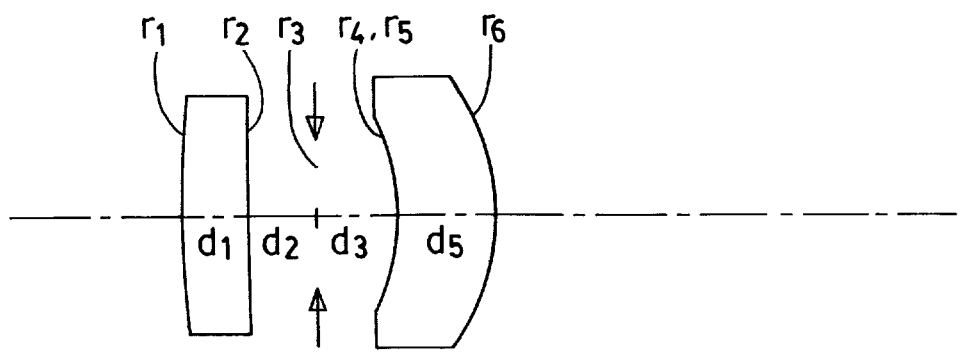
FIG. 8 is a sectional schematic of Example 3 inclusive of an optical axis thereof.
Figure 9:
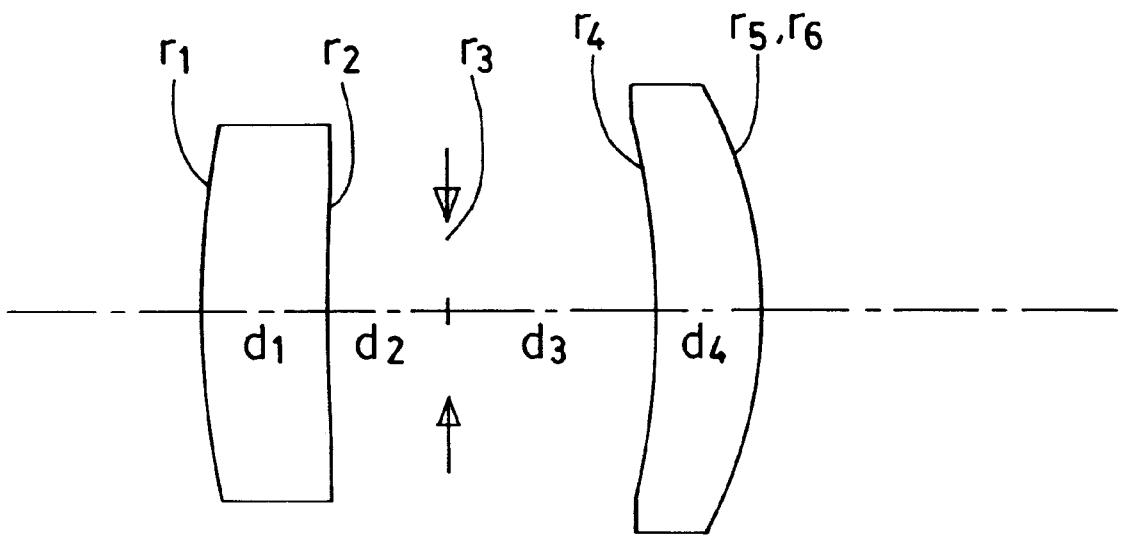
FIG. 9 is a sectional schematic of Example 4 inclusive of an optical axis thereof.

With reference to the problem regarding the unnecessary order of light, the preferable design order is 1 in the first to sixth phototaking optical system embodiments. FIG. 5 shows diffraction efficiency changes when the design order is 1 to 5 in equation (c) explained with reference to the prior art. From FIG. 5 it is found that as the design order increases, the diffraction efficiency drops sharply with wavelength changes in a wide wavelength range in which phototaking optical systems are used. To reduce the occurrence of flare due to the unnecessary order of light, therefore, it is preferable that the design order is 1 at which the minimum diffraction efficiency is obtained.

In reference to the same problem, it is preferable in the first to sixth phototaking optical system embodiments to use a design wavelength $\lambda_{DOE}$ at which the maximum diffraction efficiency is achieved, as defined below.

$$470 \text{ nm} < \lambda_{DOE} < 550 \text{ nm} \qquad (9)$$

Condition (9) gives a definition of design wavelength $\lambda_{DOE}$ in such a manner that flare due to DOE does not noticeably show up, while taking into account the transmittance of lenses, the spectral properties of film, CCD, etc., and the spectral properties of a light source. Above the upper limit of 550 nm or below the lower limit of 470 nm flare becomes relatively noticeable.

In addition, the first to sixth phototaking optical system embodiments may be modified as follows.

In some cases, the diffractive surface of a DOE is formed in a plane shape. If this is done, it is then easy to fabricate the diffractive surface. However, such a plane form of diffractive surface is unfavorable because coma is likely to occur with an increase in the angle of incidence of light thereon. For this reason and in view of the correction of aberrations, it is preferable to impart a certain curvature to the surface of the DOE providing the diffractive surface.

For a conventional lens system, achromatization is achieved by using a negative lens relative to a positive lens. In the case of a DOE having reciprocal dispersion, however, achromatization is achieved by using a DOE of positive power relative to a positive lens. In the lens system according to the present invention, too, it is preferable that the diffractive surface has positive power.

At this time, it is preferable that the power of the diffractive surface satisfies the following condition (7):

$$0.02 < f/f_{DOE} < 0.5 \qquad (7)$$

Here f is a focal length of the overall phototaking optical system and $f_{DOE}$ is a power of the diffractive surface.

When the upper limit of 0.5 in condition (7) is exceeded, the power of the diffractive surface becomes too strong to cause over-correction of chromatic aberrations, resulting in performance loss, and when the lower limit of 0.02 is not reached, the power of the diffractive surface becomes too small to cause under-correction of chromatic aberrations, resulting in no performance improvement.

To achieve ever-higher performance, it is desired that the power of the diffractive surface satisfies the following condition (8):

$$0.05 < f/f_{DOE} < 0.25 \quad (8)$$

The diffractive surface is preferably in a kinoform configuration because unnecessary light is reduced with good image quality by increasing the efficiency of utilization of light of the phototaking optical system. It is also preferable to use a so-called binary optical element that is a stepwise approximation of the kinoform configuration.

Plastic DOEs are best suited for use on cameras, etc., because they can be mass-produced by monolithic molding. Low-hygroscopicity plastic DOEs are less susceptible to shape changes due to humidity, and so deterioration of performance due to environmental changes. When DOEs are constructed of glass, etc., it is not easy to provide fine diffraction gratings on the surfaces of lenses. For ease of manufacture, it is then preferable to provide a diffraction grating on the surface of a thin resin layer formed on the surface of glass. In view of productivity, it is then preferable to use a resin curable by ultraviolet rays, heat, etc.

When a phototaking element is a CCD, etc., it is required to make an optical system telecentric because the quantity of light must be obtained by making the angle of incidence of light substantially vertical to the CCD. However, such an arrangement is not preferable because of an increased overall length. It is therefore preferable to set the exit pupil of the optical system at a finite position.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

Examples 1 to 16 of the phototaking optical system of the invention using a diffractive optical element are now explained below.

The diffractive surface used in the lens system of the present invention has been designed using the ultra-high index technique, and is more specifically expressed in the form of a refractive lens having a refractive index of 1001 as measured at a thickness of 0 and a d-line wavelength. In numerical data given later, too, the diffractive surface is given by an ordinary aspherical formula as described below. That is, the aspherical shape is given by $$Z = CY^2/[1+\sqrt{\{1-(1+K)C^2Y^2\}}] + A_4 Y^4 + A_6 Y^6 + A_8 Y^8 + A_{10} Y^{10} \quad (e)$$

where Z is an axis representing an optical axis direction, Y is an axis representing a direction perpendicular to the optical axis, C is a curvature of a surface apex (=1/r where r is a radius of curvature), K is a conical coefficient, and $A_4$, $A_6$, $A_8$, and $A_{10}$ are fourth, sixth, eighth, and tenth aspherical coefficients, respectively.

A surface that is in contact with the diffractive surface at a thickness of 0 is a surface of DOE substrate material. In actual production, a phase change is first found from a difference between the aspherical shape of the diffractive surface and the surface shape of the substrate material, and the index of refraction. Then, this phase change is converted into the pitch of a diffraction grating, which is in turn formed on the surface of the substrate material. For this reason, the aspheric surface defined by the ultra-high index refractive lens does not actually exist, although referred to as a diffractive surface. It is noted, however, that the surface Number ("NO.") referred to as the diffractive surface in the numerical data is denoted as a substrate surface in the sectional schematic corresponding to each example.

Figure 2:
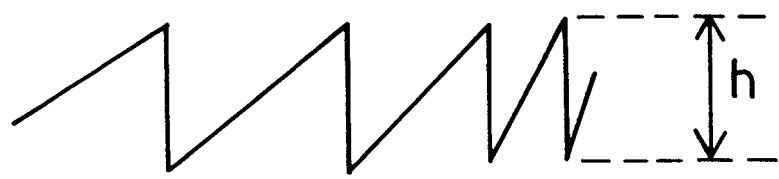
FIG. 2 illustrates a sectional shape of the kinoform.
Figure 3:
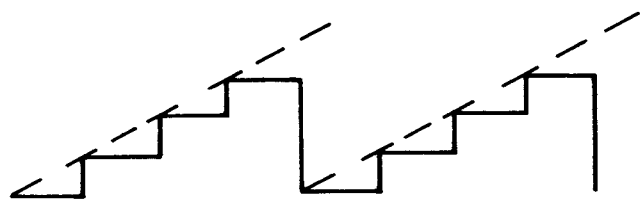
FIG. 3 illustrates a sectional shape of the binary optical element.

Some specific shapes of the diffractive surface, for instance, are shown in section in FIG. 30. A diffractive surface depicted in FIG. 30(a) comprises an alternation of transparent portions 21, and opaque portions 22 whose thickness is substantially zero, and is called an amplitude modulation type. A diffractive surface depicted in FIG. 30(b) comprises an alternation of portions having different indices of refraction, i.e., a high-refractive-index portions 23 and low-refractive-index portions 24, and produces diffraction action through a phase difference due to a refractive index difference. A diffractive surface depicted in FIG. 30(c) comprises an alternation of convex and concave portions, each in a rectangular form, and produces diffractive action through a phase difference due to a thickness difference. This may be called a two-level binary element. A diffractive surface depicted in FIG. 30(d), called a kinoform, is in a saw-toothed form, and produces diffractive action through a phase difference due to a continuous thickness difference (see FIG. 2). Diffractive surfaces depicted in FIG. 30(e) and 30(f) are binary elements with the kinoform approximated at four, and eight levels, respectively (see FIG. 3). In the present invention, it is desired to use the kinoform of FIG. 30(d), and the binary element of FIG. 30(e) or 30(f), with the kinoform approximated at four or more levels, because the quantity of light can effectively be used at an increased diffraction efficiency.

Sectional schematics of Examples 1 through 16 including their optical axes are shown in FIGS. 6 through 21. Set out below are Examples 1 through 16.

EXAMPLES 1 TO 4

In Examples 1, 2, 3 and 4 an aperture stop is located between two positive lenses, as can be seen from FIGS. 6, 7, 8, and 9, respectively. In Example 1 a first positive lens in a meniscus form that is convex toward an object side of the system, an aperture stop, and a second positive lens in a double convex form are located in order from the object side, and a diffractive surface (DOE) is formed on the object side of the first lens. In Examples 2, 3, and 4, a first positive lens in a meniscus form that is convex toward an object side of the system, an aperture stop, and a second positive lens in a meniscus form that is convex toward an image side of the system, are located in order from the object side. A diffractive surface is formed on the image side of the first lens in Example 2, on the object side of the second lens in Example 3, and on the image side of the second lens in Example 4. In Examples 2, 3, and 4 the diffractive surface is formed on an acrylic resin substrate. Throughout Examples 1 to 4, all the diffractive surfaces are in an aspheric form.

EXAMPLES 5 & 6

Figure 10:
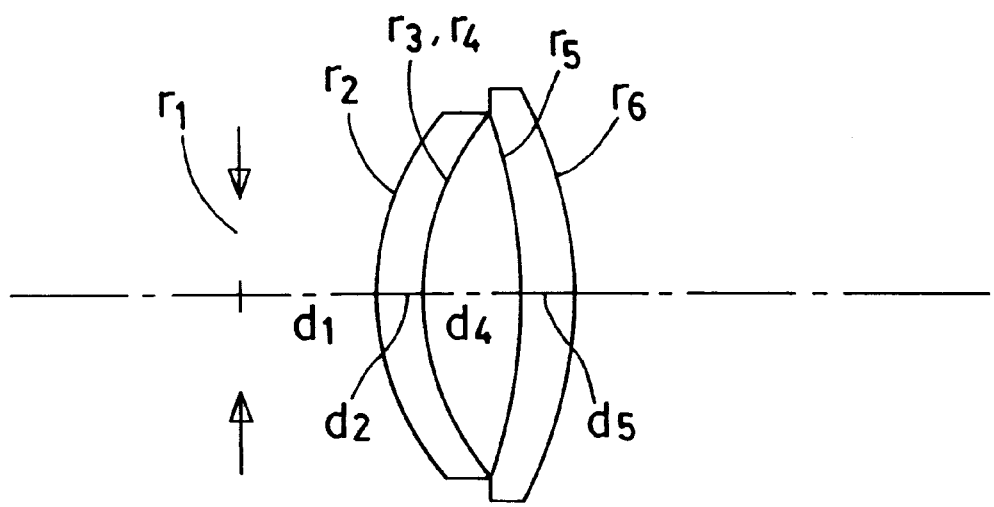
FIG. 10 is a sectional schematic of Example 5 inclusive of an optical axis thereof.
Figure 11:
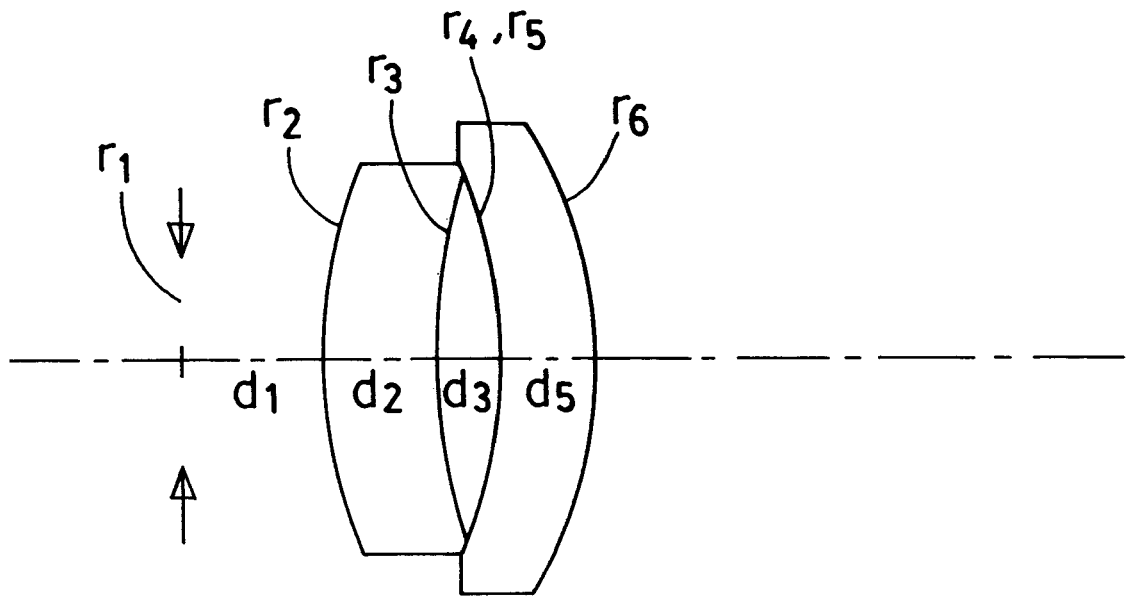
FIG. 11 is a sectional schematic of Example 6 inclusive of an optical axis thereof.

In Examples 5, and 6 an aperture stop is located between an object side of the system and an arrangement consisting of two positive lenses, as can be seen from FIGS. 10, and 11, respectively. More specifically, the aperture stop, a first positive lens in a meniscus form that is convex toward the object side, and a second positive lens in a meniscus form that is convex toward an image side of the system are located in order from the object side, and two aspheric surfaces are used, one on the object side of the first positive lens and another on the image side of the second positive lens. A diffractive surface is formed on the image side of the first positive lens in Example 5, and on the object side of the second positive lens in Example 6. In Example 6, both the positive lenses are formed of acrylic resin and a diffractive surface is formed on the substrate of the second positive lens. In Examples 5, and 6 the diffractive surface is in an aspheric form.

EXAMPLES 7 & 8

Figure 12:
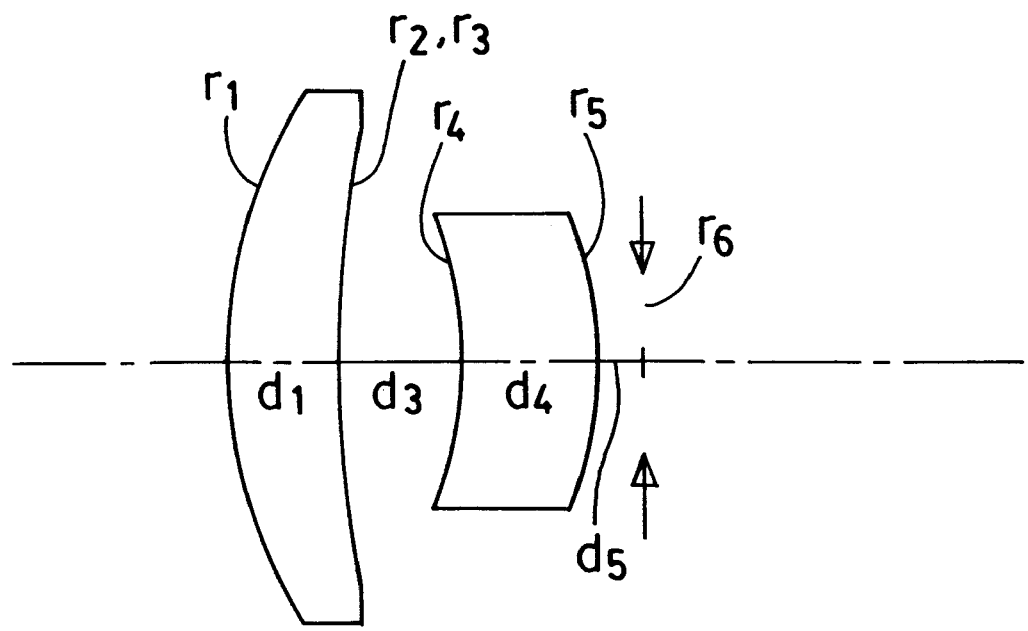
FIG. 12 is a sectional schematic of Example 7 inclusive of an optical axis thereof.
Figure 13:
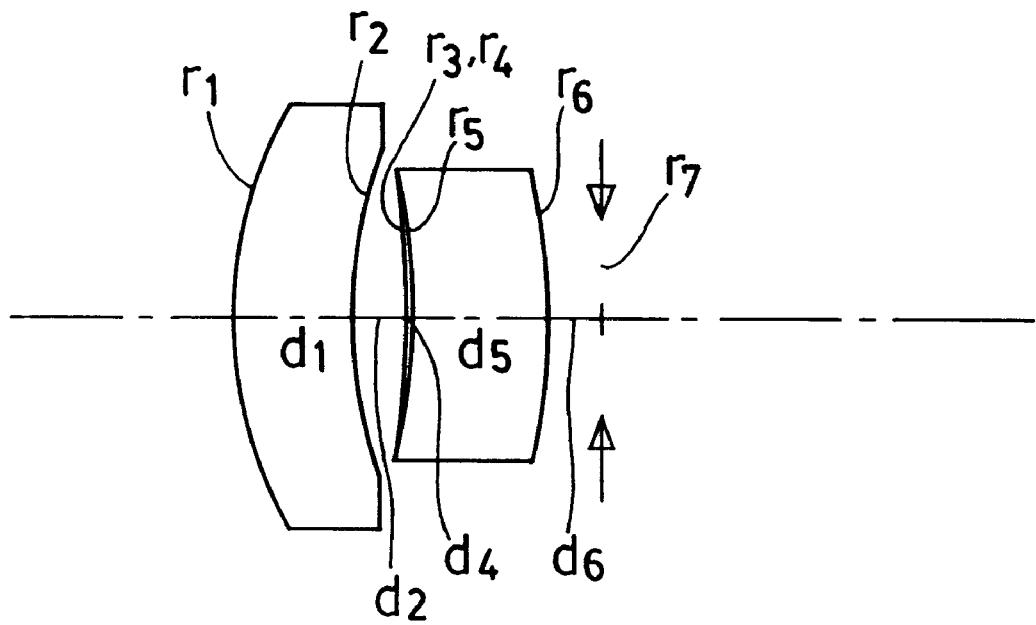
FIG. 13 is a sectional schematic of Example 8 inclusive of an optical axis thereof.

In Examples 7, and 8 an aperture stop is located between an image side of the system and an arrangement consisting of two positive lenses, as can be seen from FIGS. 12, and 13, respectively. More specifically, a first positive lens in a meniscus form that is convex toward an object side of the system, a second positive lens in a meniscus form that is convex toward the image side, and the aperture stop are located in order from the object side. In Example 7 aspheric surfaces are formed, one on the object side of the first positive lens and another on the image side of the second positive lens, and in Example 8 an aspheric surface is formed on the object side of the first positive lens. A diffractive surface is formed on the image side of the first positive lens in Example 7, and on the object side of the second positive lens in Example 8. In Example 7 both the positive lenses are formed of polyolefinic resin of low hygroscopicity and the diffractive surface is formed on a substrate of the first positive lens. In Example 8 the diffractive surface is formed on the surface of a thin resin layer on a glass substrate. In both Examples 7 and 8 the diffractive surfaces are in an aspheric form.

EXAMPLES 9 & 10

Figure 14:
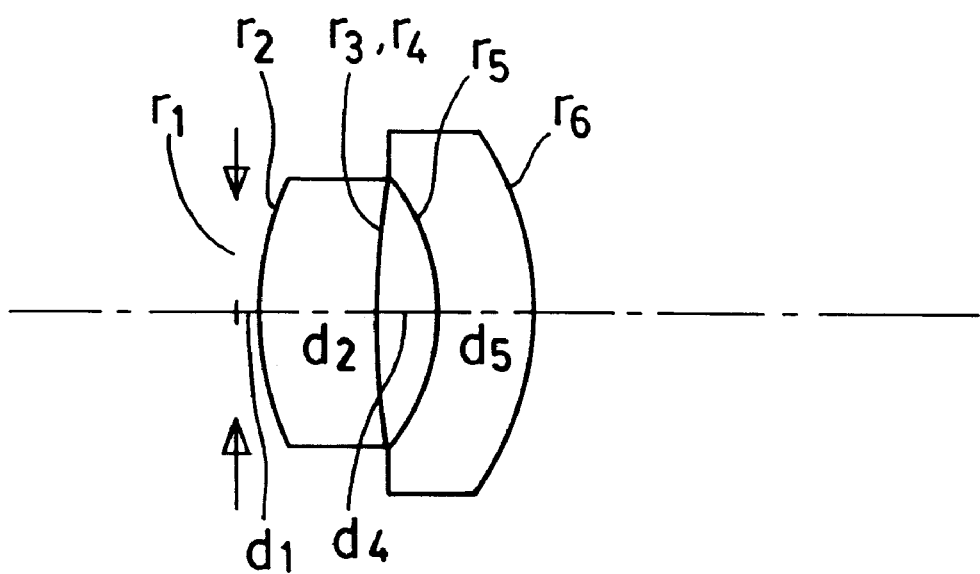
FIG. 14 is a sectional schematic of Example 9 inclusive of an optical axis thereof.
Figure 15:
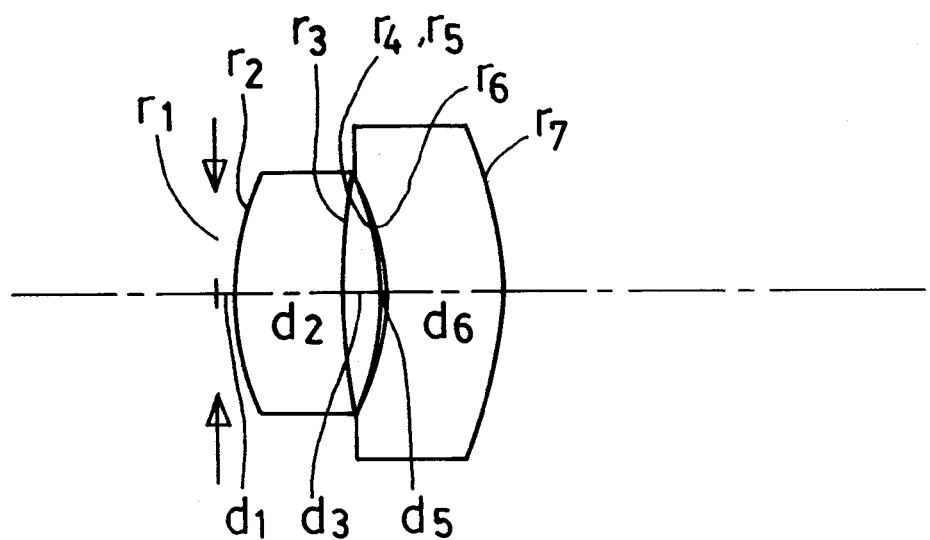
FIG. 15 is a sectional schematic of Example 10 inclusive of an optical axis thereof.

In Examples 9, and 10 an aperture stop is located between an object side of the system and an arrangement consisting of two lenses, positive and negative, as can be seen from FIGS. 14, and 15, respectively. More specifically, a first positive lens in a meniscus form toward the object side, a second negative lens in a meniscus form convex toward an image side of the system, and the aperture stop are located in order from the object side, and aspheric surfaces are formed, one on the object side of the first positive lens and another on the image side of the second negative lens. A diffractive surface is formed on the image side of the first positive lens in Example 9, and on the object side of the second negative lens in Example 10. In Example 9 both the lenses are formed of polyolefinic resin of low hygroscopicity and the diffractive surface is formed on a substrate of the first positive lens. In Example 10 the diffractive surface is formed on the surface of a thin resin layer on a glass substrate. In both Examples 9 and 10 the diffractive surfaces are in an aspheric form.

EXAMPLE 11

Figure 16:
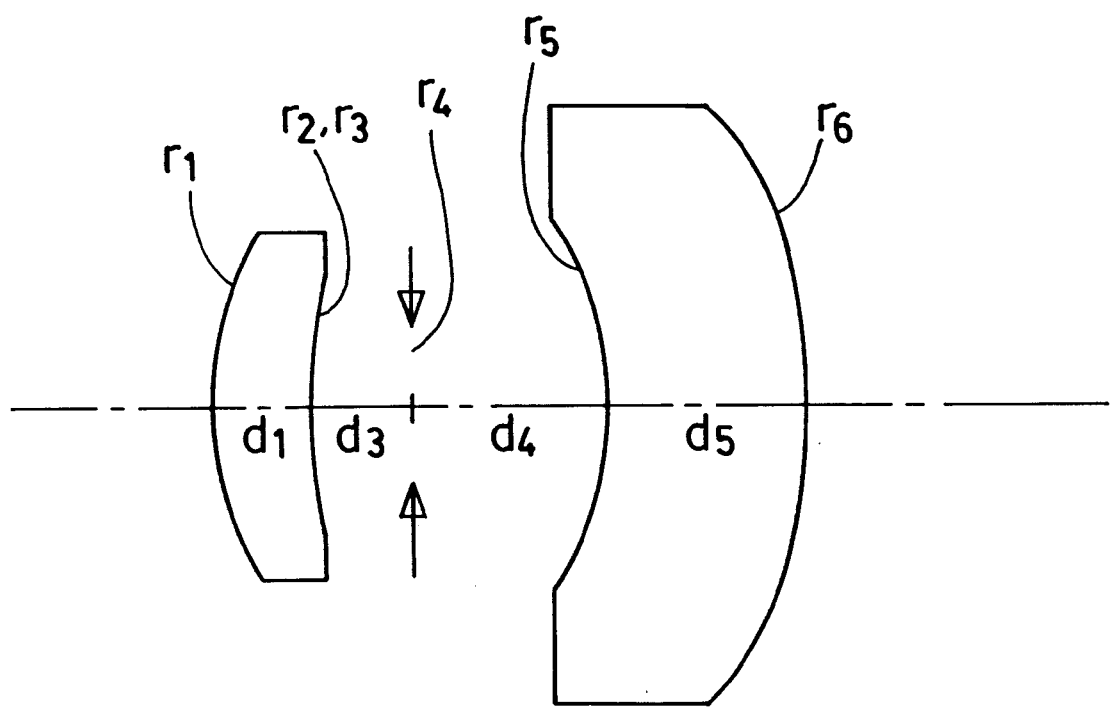
FIG. 16 is a sectional schematic of Example 11 inclusive of an optical axis thereof.

In Example 11 an aperture stop is located between two lenses, positive and negative, in order from an object side of the system, as can been from FIG. 16. More specifically, a first positive lens in a meniscus form that is convex toward the object side, the aperture stop, and a second negative lens that is in a meniscus form that is convex toward an image side of the system are located in order from the object side. Aspheric surfaces are formed, one on the object side of the first positive lens and two on both sides of the second negative lens, and a diffractive surface is formed on the image side of the first positive lens. The first positive lens is formed of acrylic resin while the second negative lens is formed of polycarbonate resin, and the diffractive surface is formed on a substrate of the first positive lens. This diffractive surface is in an aspheric form.

EXAMPLES 12 & 13

Figure 17:
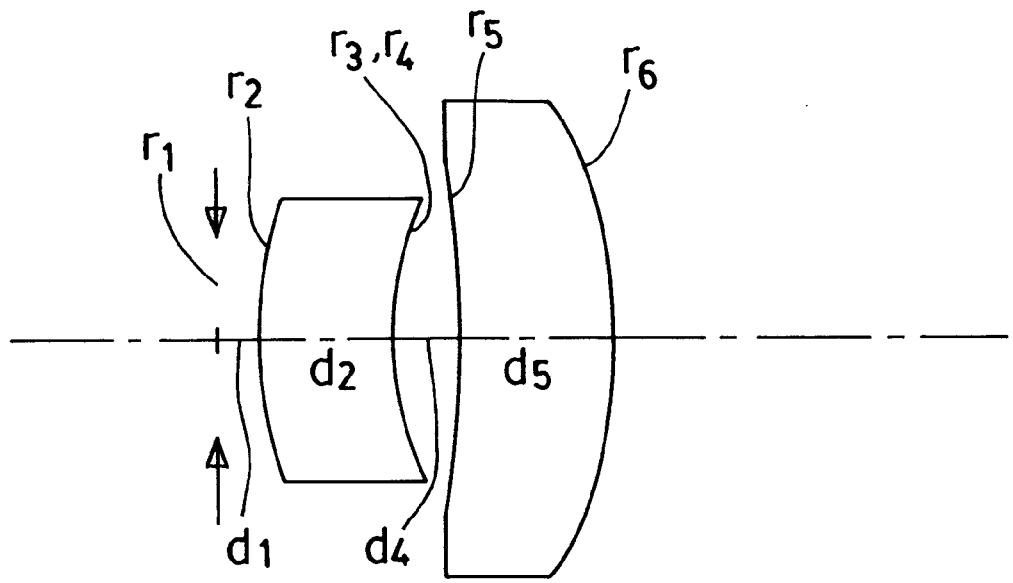
FIG. 17 is a sectional schematic of Example 12 inclusive of an optical axis thereof.
Figure 18:
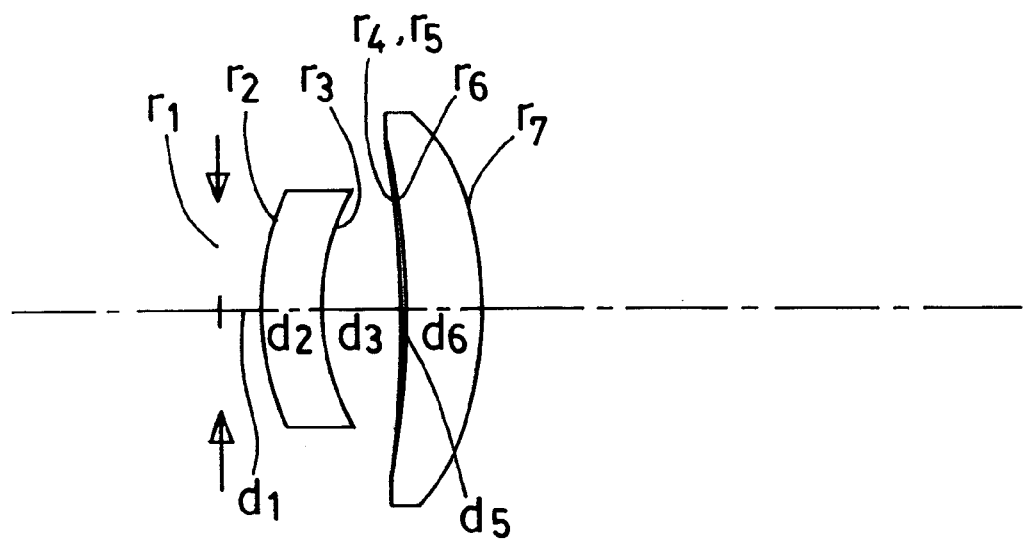
FIG. 18 is a sectional schematic of Example 13 inclusive of an optical axis thereof.

In Examples 12, and 13 an aperture stop is located between an object side of the system and an arrangement consisting of two lenses, negative and positive, in order from the object side, as can be seen from FIGS. 17, and 18, respectively. More specifically, the aperture stop, a first negative lens in a meniscus form convex toward the object side, and a second positive lens in a meniscus form convex toward an image side of the system are located in order from the object side. Two aspheric surfaces are used in Example 12, one on the object side of the first negative lens and another on the image side of the second positive lens, and three aspheric surfaces are used in Example 13, two on both surfaces of the first negative lens and one on the image side of the second positive lens. A diffractive surface is formed on the image side of the first negative lens in Example 12, and on the object side of the second positive lens in Example 13. In Example 12 the diffractive surface is formed on a low-hygroscopicity polyolefinic resin substrate of the first negative lens. In Example 13 the diffractive surface is formed on the surface of a thin resin layer provided on a glass substrate. The diffractive surface is in an aspheric form in Example 12, and in a spherical form in Example 13.

EXAMPLE 14

Figure 19:
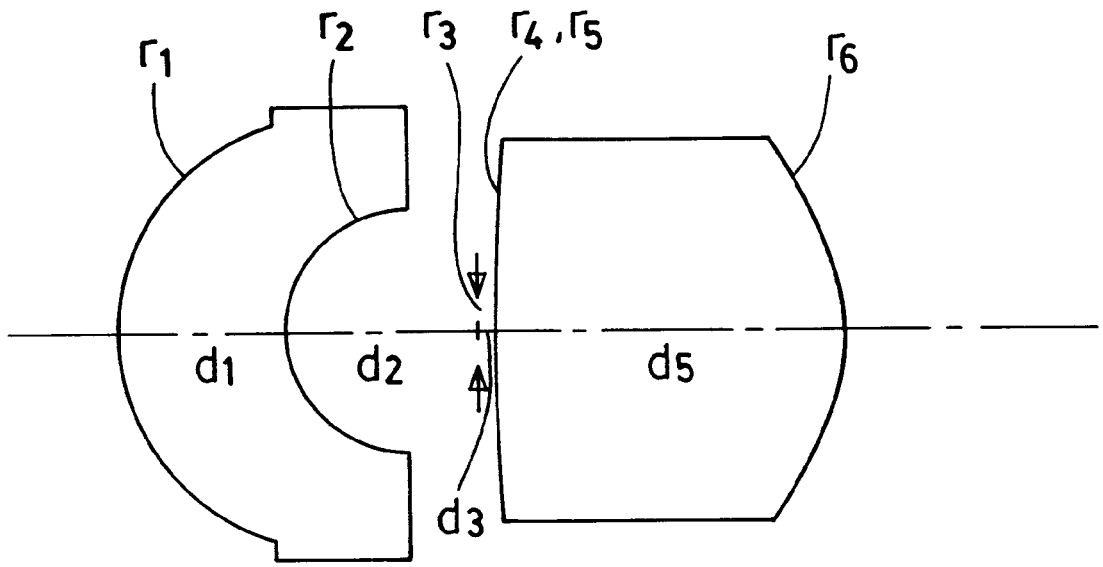
FIG. 19 is a sectional schematic of Example 14 inclusive of an optical axis thereof.

In Example 14 an aperture stop is located between two lenses, negative and positive, in order from an object side of the system, as can be seen from FIG. 19. More specifically, a first negative lens in a meniscus form that is convex toward the object side, the aperture stop, and a second positive lens in a double-convex form are located in order from the object side. Aspheric surfaces are formed, one on the object side of the first negative lens and another on the image side of the second positive lens, and a diffractive surface is formed on the object side of the second positive lens. The first negative lens is formed of polycarbonate resin, and the second positive lens is formed of polyolefinic resin having low hygroscopicity. The diffractive surface is formed on the substrate of the second positive lens. The diffractive surface is in a spherical form.

EXAMPLES 15 & 16

Figure 20:
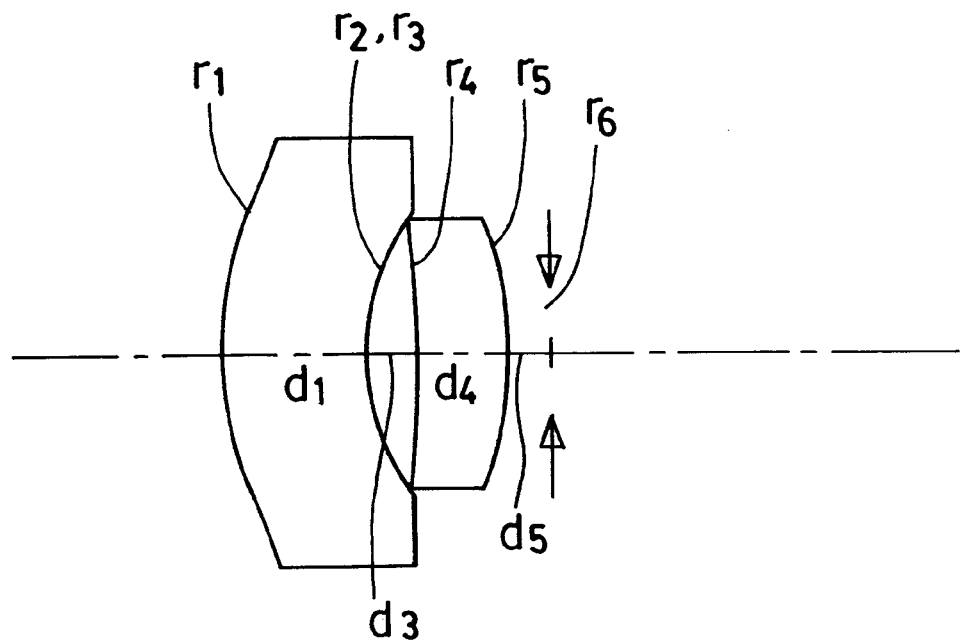
FIG. 20 is a sectional schematic of Example 15 inclusive of an optical axis thereof.
Figure 21:
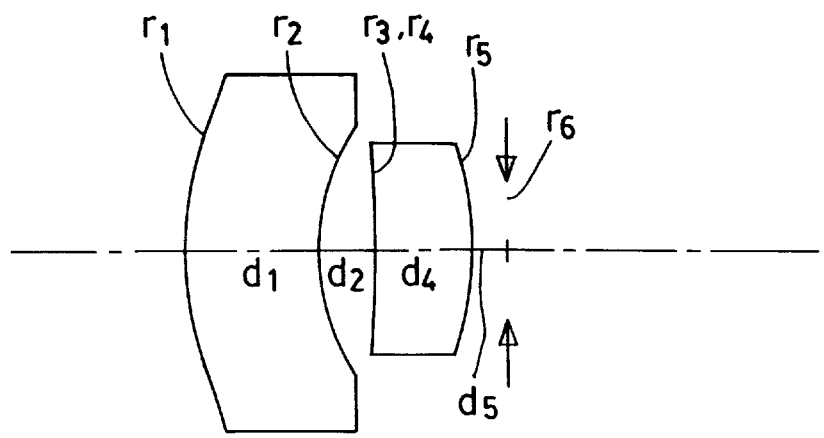
FIG. 21 is a sectional schematic of Example 16 inclusive of an optical axis thereof.
Figure 22:
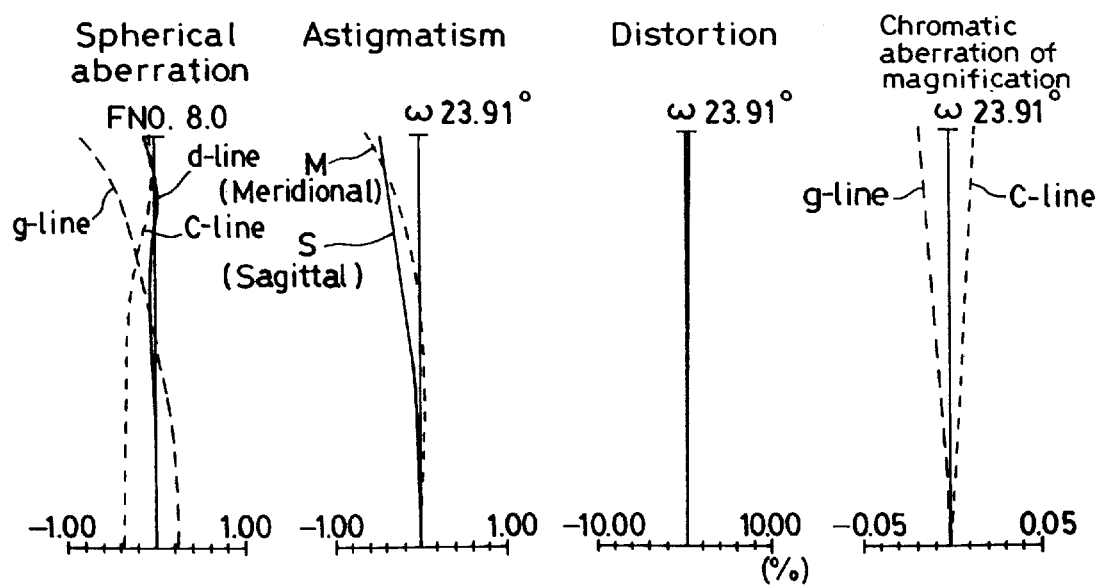
FIG. 22 is an aberration diagram for Example 1, wherein (a), (b), (c), and (d) show spherical aberration, astigmatism, distortion, and chromatic aberration of magnification, respectively.
Figure 23:
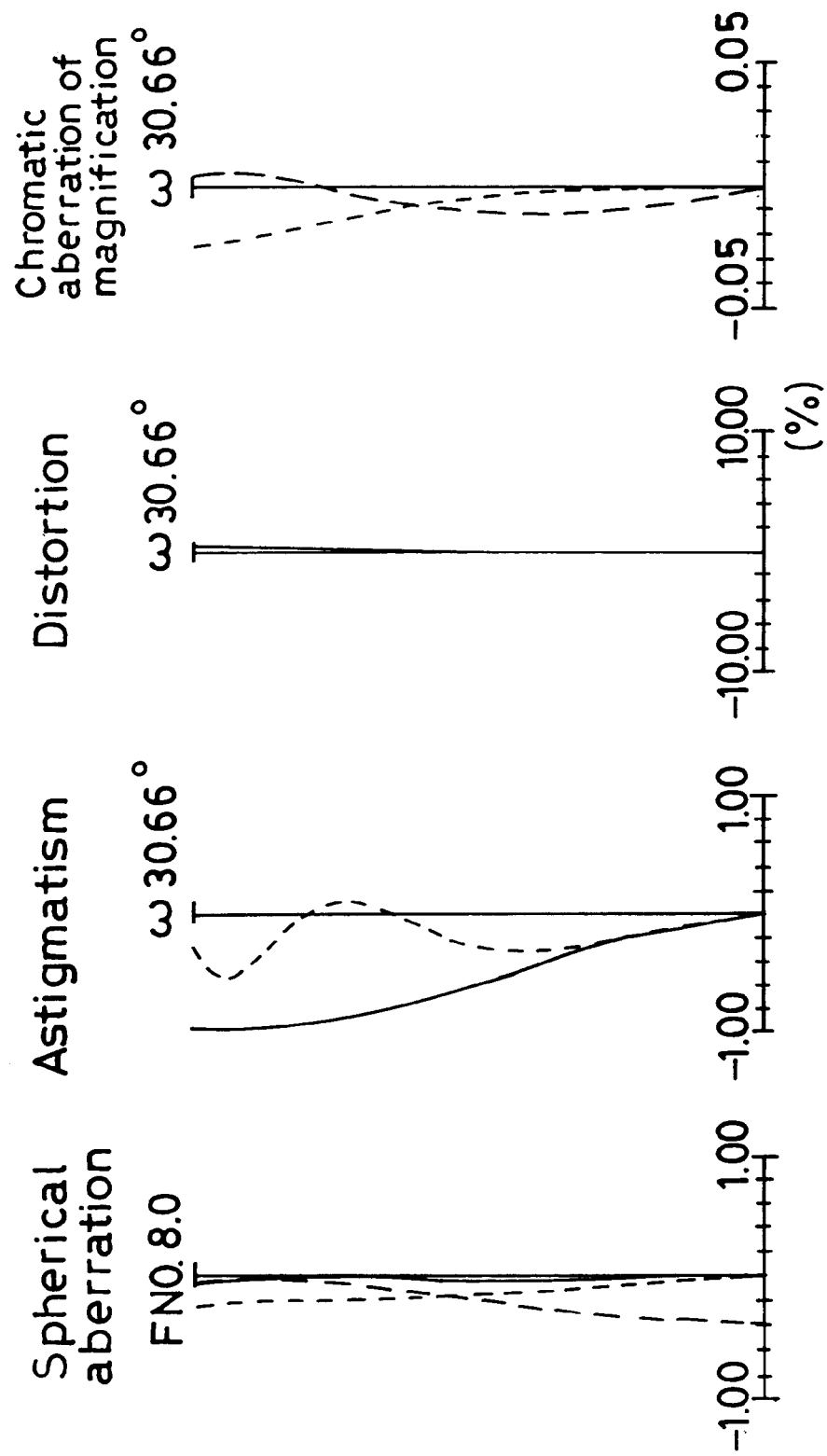
FIG. 23 is a similar aberration diagram for Example 5.
Figure 24:
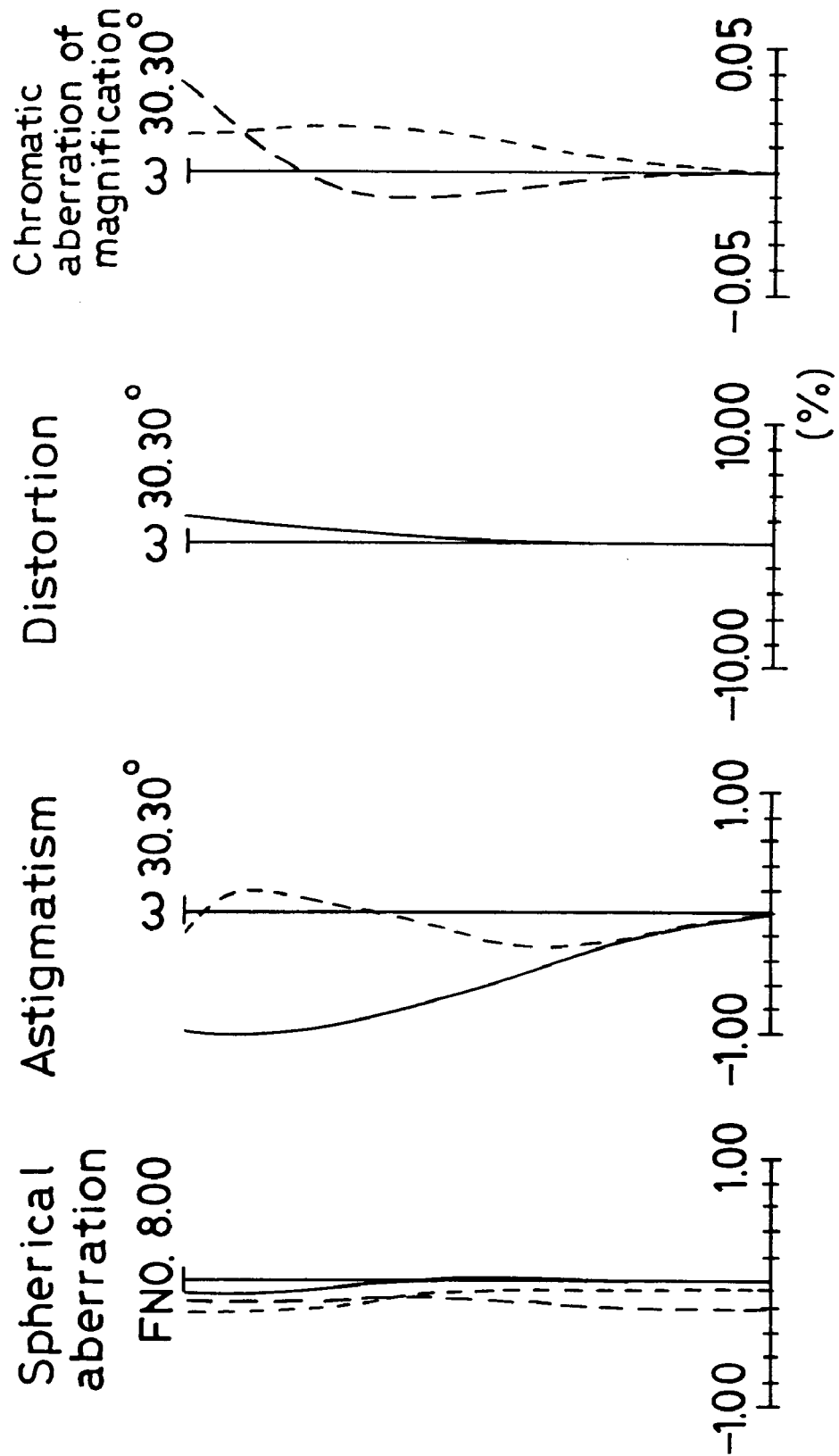
FIG. 24 is a similar aberration diagram for Example 7.
Figure 25:
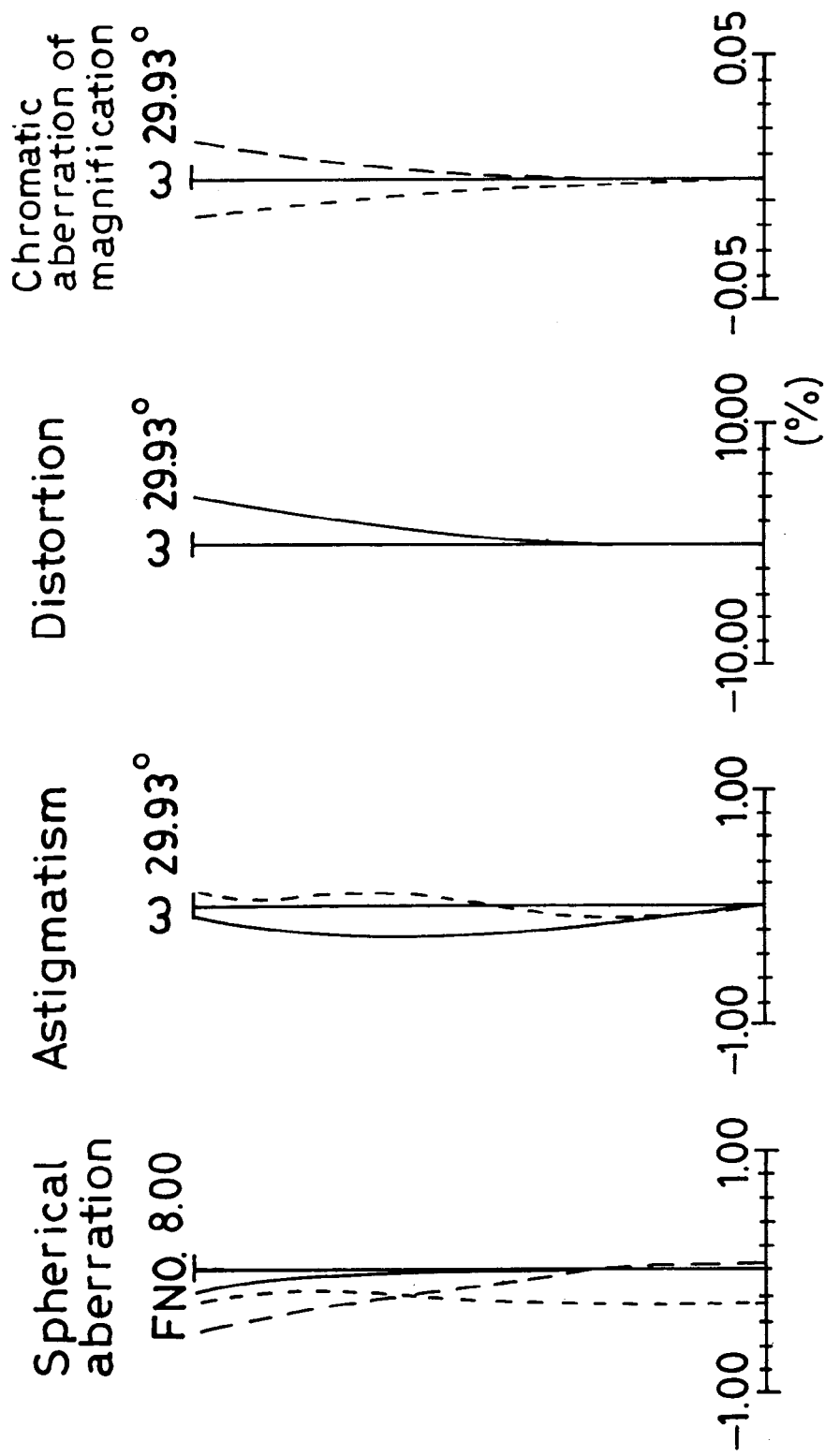
FIG. 25 is a similar aberration diagram for Example 9.
Figure 26:
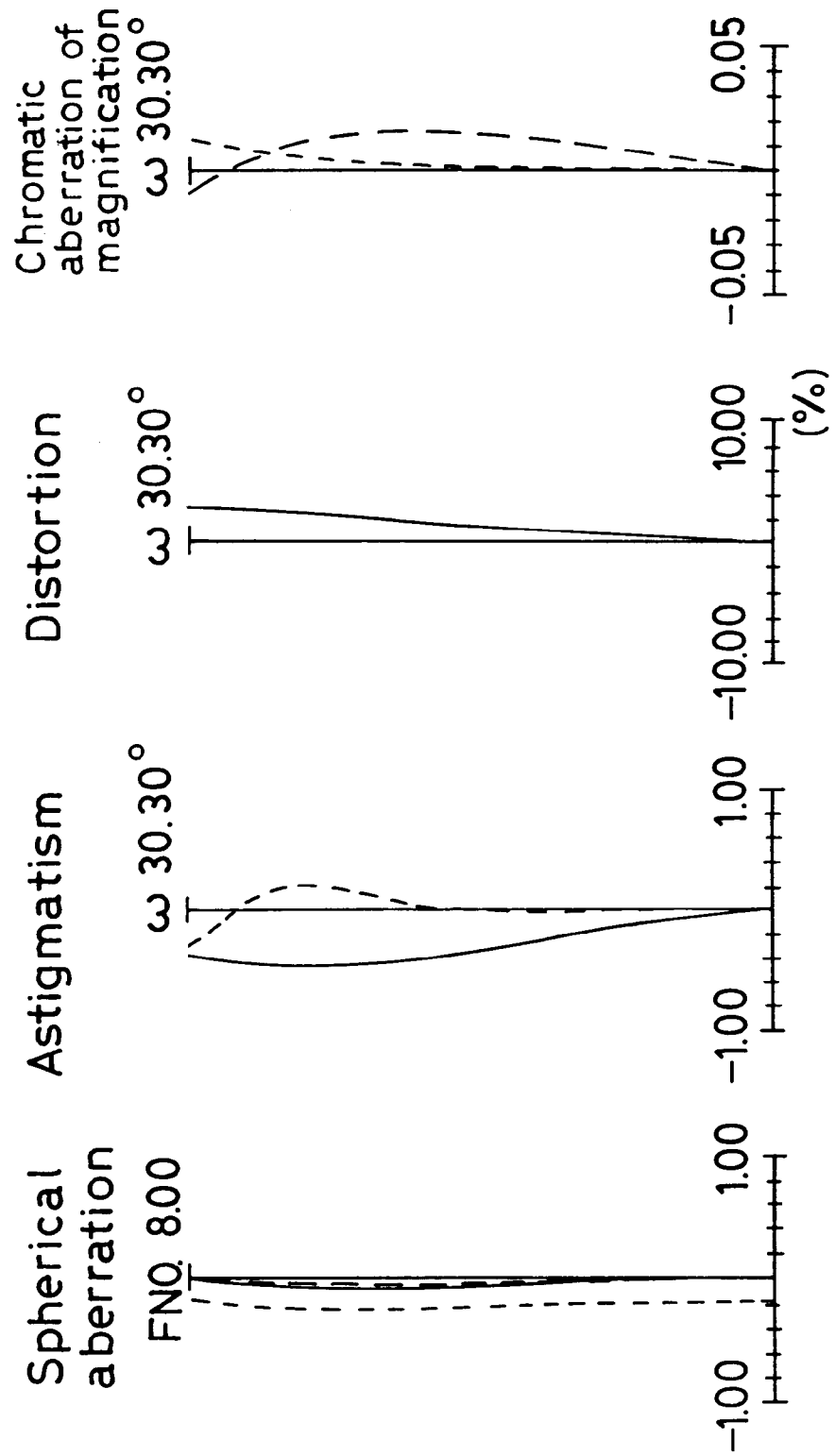
FIG. 26 is a similar aberration diagram for Example 11.
Figure 27:
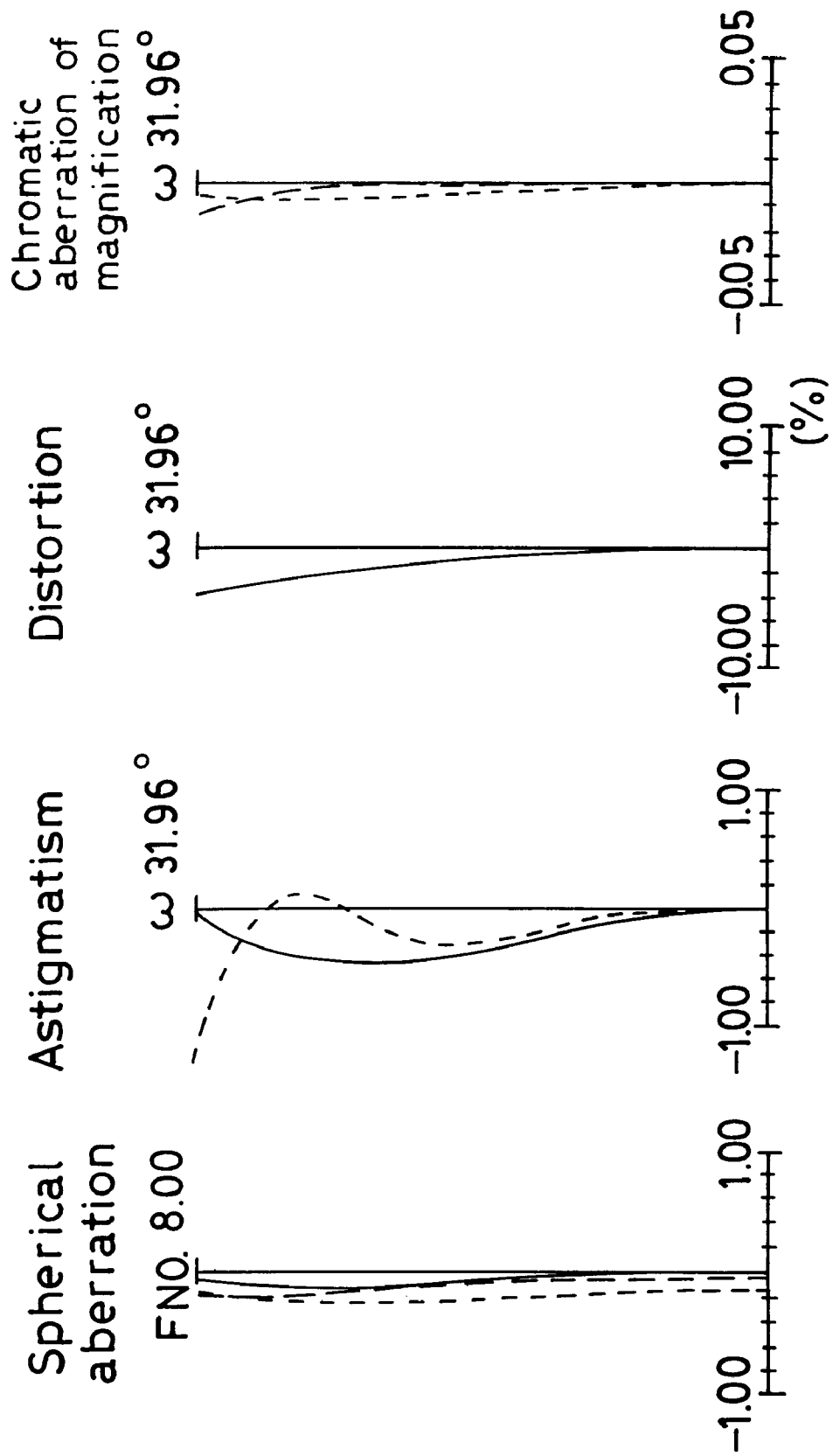
FIG. 27 is a similar aberration diagram for Example 12.
Figure 30A:
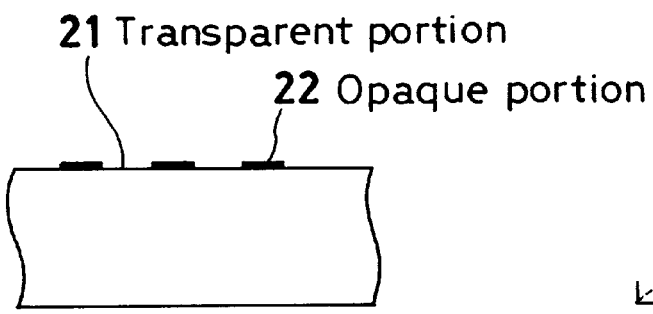
FIG. 30 is a sectional schematic illustrative of specific shapes of the diffractive surface used in the invention.
Figure 30B:
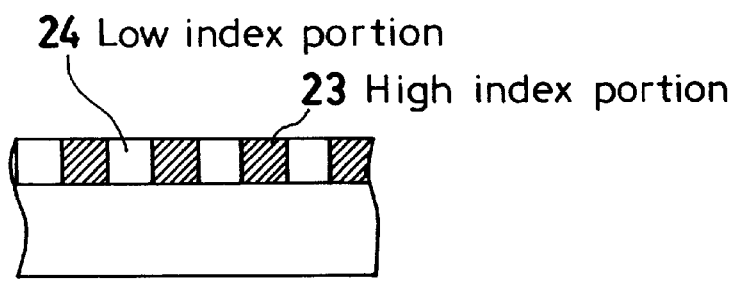
Figure 30C:
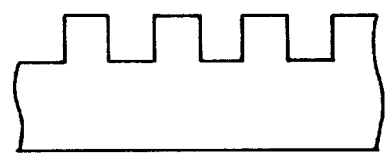
Figure 30D:
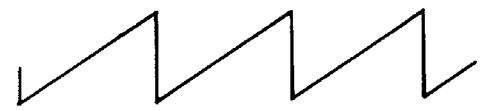
Figure 30E:
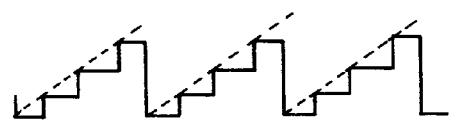
Figure 30F:
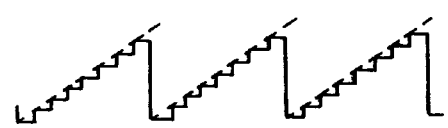

In Examples 15, and 16 an aperture stop is located between an image side of the system and an arrangement consisting of two lenses, negative and positive, in order from an object side of the system, as can be seen from FIGS. 20, and 21, respectively. More specifically, a first negative lens in a meniscus form that is convex toward the object side, a second positive lens that is in a meniscus lens convex toward the image side, and the aperture stop are located in order from the object side. Aspheric surfaces are formed in Example 15, one on the object side of the first negative lens and another on the image side of the second positive lens, and three aspheric surfaces are formed in Example 16, two on both surfaces of the first negative lens and on the image side of the second negative lens. A diffractive surface is formed on the image side of the first negative lens in Example 15, and on the object side of the second positive lens in Example 16. In Example 15 the first negative lens is formed of polycarbonate resin on which the diffractive surface is provided. The diffractive surface is in an aspheric form in Example 15, and in a spherical form in Example 16.

Enumerated below are numerical data about Examples 1 to 16, wherein f=focal length, $F_{NO}$=F-number, $F_B$=back focus, ω=half field angle, $r_1$, $r_2$, etc.=radii of curvature of lens surfaces, $d_1$, $d_2$, etc.=spacing between lens surfaces, $n_{d1}$, $n_{d2}$, etc.=d-line refractive indices of lenses, and $v_{d1}$, $v_{d2}$, etc.=d-line Abbe number. The aspheric shape is represented by the aforesaid equation (e). Note that the abbreviation "DIFER. SF" indicates a diffractive surface.

EXAMPLE 1 f=48.58 mm, $F_{NO}$=8.0, $f_B$=39.04 mm, ω=23.91°

| | | | |
|---|---|---|---|
| $r_1$ = 6.91373 (DIFFR. SF) | $d_1$ = 0 | $n_{d1}$ = 1001 | $v_{d1}$ = −3.45 |
| $r_2$ = 6.91384 | $d_2$ = 2.29102 | $n_{d2}$ = 1.69680 | $v_{d2}$ = 55.53 |
| $r_3$ = 6.21043 | $d_3$ = 1.57116 | | |
| $r_4$ = ∞ (Stop) | $d_4$ = 2.74000 | | |
| $r_5$ = 38.30240 | $d_5$ = 2.50000 | $n_{d3}$ = 1.51633 | $v_{d3}$ = 64.14 |
| $r_6$ = −145.27686 | | | |

Aspherical Coefficients 1 st surface

K=−0.0175

$A_4$=6.5806×10$^{-6}$ $A_6$=1.3958×10$^{-7}$ $A_8$=1.9281×10$^{-9}$ $A_{10}$=1.0779×10$^{-10}$

EXAMPLE 2 f=36.06 mm, $F_{NO}$=8.0, $f_B$=29.48 mm, ω=30.43°

| | | | |
|---|---|---|---|
| $r_1$ = 7.42410 | $d_1$ = 3.09803 | $n_{d1}$ = 1.49241 | $v_{d1}$ = 57.66 |
| $r_2$ = 7.78222 | $d_2$ = 0 | $n_{d2}$ = 1001 | $v_{d2}$ = −3.45 |
| $r_3$ = 7.78246 (DIFFR. SF) | $d_3$ = 1.83377 | | |
| $r_4$ = ∞ (Stop) | $d_4$ = 0.50406 | | |
| $r_5$ = −62.16903 | $d_5$ = 3 | $n_{d3}$ = 1.74400 | $v_{d3}$ = 44.78 |
| $r_6$ = −27.10094 | | | |

Aspherical Coefficients 3 rd surface

K=−0.0917

$A_4$=2.4369×10$^{-5}$ $A_6$=4.0193×10$^{-7}$ $A_8$=3.2435×10$^{-9}$ $A_{10}$=2.2080×10$^{-10}$

EXAMPLE 3 f=35.94 mm, $F_{NO}$=8.0, $f_B$=35.73 mm, ω=31.22°

| | | | |
|---|---|---|---|
| $r_1$ = 33.62695 | $d_1$ = 2.00000 | $n_{d1}$ = 1.51633 | $v_{d1}$ = 64.15 |
| $r_2$ = 3203.77273 | $d_2$ = 2.00000 | | |
| $r_3$ = ∞ (Stop) | $d_3$ = 2.35882 | | |
| $r_4$ = −7.63487 (DIFFR. SF) | $d_4$ = 0.00000 | $n_{d2}$ = 1001 | $v_{d2}$ = −3.45 |
| $r_5$ = −7.63464 | $d_5$ = 3.00000 | $n_{d3}$ = 1.49241 | $v_{d3}$ = 57.66 |
| $r_6$ = −7.20525 | | | |

Aspherical Coefficients 4 th surface

K=−0.0002

$A_4$=−1.1363×10$^{-7}$ $A_6$=−3.4337×10$^{-8}$ $A_8$=4.3313×10–9

$A_{10}$=−2.0047×10$^{-10}$

EXAMPLE 4 f=36.02 mm, $F_{NO}$=8.0, $f_B$=31.87 mm, ω=30.93°

| | | | |
|---|---|---|---|
| $r_1$ = 19.71078 | $d_1$ = 3.00000 | $n_{d1}$ = 1.51633 | $v_{d1}$ = 64.15 |
| $r_2$ = 30.64933 | $d_2$ = 3.00000 | | |
| $r_3$ = ∞ (Stop) | $d_3$ = 5.00000 | | |
| $r_4$ = −20.19943 | $d_4$ = 2.50000 | $n_{d2}$ = 1.49241 | $v_{d2}$ = 57.66 |
| $r_5$ = −11.84776 | $d_5$ = 0.00000 | $n_{d3}$ = 1001 | $v_{d3}$ = −3.45 |
| $r_6$ = −11.84746 (DIFFR. SF) | | | |

Aspherical Coefficients 6 th surface

K=0.0000

$A_4$=7.0440×10$^{-8}$ $A_6$=−6.2362×10$^{-9}$ $A_8$=2.9135×10$^{-10}$ $A_{10}$=−4.7735×10$^{-12}$

EXAMPLE 5 f=36.23 mm, $F_{NO}$=8.0, $f_B$=33.79 mm, ω=30.66°

| | | | |
|---|---|---|---|
| $r_1$ = ∞ (Stop) | $d_1$ = 3.40340 | | |
| $r_2$ = 6.58384 (Aspheric) | $d_2$ = 1.20000 | $n_{d1}$ = 1.57099 | $v_{d1}$ = 50.80 |
| $r_3$ = 6.87553 | $d_3$ = 0.00000 | $n_{d2}$ = 1001 | $v_{d2}$ = −3.45 |
| $r_4$ = 6.87561 (DIFFR. SF) | $d_4$ = 2.30073 | | |
| $r_5$ = −13.48876 | $d_5$ = 1.20000 | $n_{d3}$ = 1.63854 | $v_{d3}$ = 55.38 |
| $r_6$ = −9.94660 (Aspheric) | | | |

Aspherical Coefficients 2 nd surface

K=−0.6318

$A_4$=−1.1042×10$^{-4}$ $A_6$=4.0200×10$^{-5}$ $A_8$=−2.8152×10$^{-6}$ $A_{10}$=1.2034×10$^{-7}$ 4 th surface

K=−0.0765

$A_4$=2.9184×10$^{-5}$ $A_6$=6.4199×10$^{-7}$ $A_8$=6.4026×10$^{-9}$ $A_{10}$=5.2385×10$^{-10}$ 6 th surface

K=−0.2013

$A_4$=5.1608×10$^{-5}$ $A_6$=−1.1148×10$^{-6}$ $A_8$=6.8045×10$^{-8}$ $A_{10}$=−8.1066×10$^{-10}$

EXAMPLE 6 f=36.07 mm, $F_{NO}$=8.0, $f_B$=33.72 mm, $\omega$=30.77°

| | | | |
|---|---|---|---|
| $r_1 = \infty$ (Stop) | $d_1 = 3.05845$ | | |
| $r_2 = 9.97541$ (Aspheric) | $d_2 = 2.47667$ | $n_{d1} = 1.49241$ | $\nu_{d1} = 57.66$ |
| $r_3 = 12.19426$ | $d_3 = 1.45021$ | | |
| $r_4 = -11.88229$ (DIFFR. SF) | $d_4 = 0.00000$ | $n_{d2} = 1001$ | $\nu_{d2} = -3.45$ |
| $r_5 = -11.88196$ | $d_5 = 2.24201$ | $n_{d3} = 1.49241$ | $\nu_{d3} = 57.66$ |
| $r_6 = -9.08945$ (Aspheric) | | | |

Aspherical Coefficients 2 nd surface
K=0
$A_4=-1.3961\times10^{-4}$
$A_6=4.0138\times10^{-6}$
$A_8=0$
$A_{10}=0$
4 th surface
K=-0.0186
$A_4=-1.3469\times10^{-6}$
$A_6=-1.6823\times10^{-8}$
$A_8=4.8156\times10^{-10}$
$A_{10}=-1.3513\times10^{-11}$
6 th surface
K=-0.1908
$A_4=7.7812\times10^{-5}$
$A_6=-3.3883\times10^{-6}$
$A_8=2.0185\times10^{-7}$
$A_{10}=2.3491\times10^{-10}$

EXAMPLE 7 f=36.10 mm, $F_{NO}$=8.0, $f_B$=31.44 mm, $\omega$=30.30°

| | | | |
|---|---|---|---|
| $r_1 = 11.59844$ (Aspheric) | $d_1 = 2.50000$ | $n_{d1} = 1.52542$ | $\nu_{d1} = 55.78$ |
| $r_2 = 25.87488$ | $d_2 = 0.00000$ | $n_{d2} = 1001$ | $\nu_{d2} = -3.45$ |
| $r_3 = 25.87622$ (DIFFR. SF) | $d_3 = 2.70248$ | | |
| $r_4 = -8.32192$ | $d_4 = 3.00000$ | $n_{d3} = 1.52542$ | $\nu_{d3} = 55.78$ |
| $r_5 = -8.91705$ (Aspheric) | $d_5 = 1.00000$ | | |
| $r_6 = \infty$ (Stop) | | | |

Aspherical Coefficients 1 st surface
K=1.4496
$A_4=-8.6872\times10^{-5}$
$A_6=1.0217\times10^{-6}$
$A_8=8.2837\times10^{-8}$
$A_{10}=-1.0350\times10^{-9}$
3 rd surface
K=-0.0204
$A_4=7.7872\times10^{-8}$
$A_6=5.9898\times10^{-9}$
$A_8=-1.0838\times10^{-10}$
$A_{10}=-1.5893\times10^{-12}$
5 th surface
K=0.2234
$A_4=3.2547\times10^{-4}$
$A_6=-3.3400\times10^{-5}$
$A_8=4.6694\times10^{-6}$
$A_{10}=-2.3879\times10^{-7}$

EXAMPLE 8 f=36.09 mm, $F_{NO}$=8.0, $f_B$=32.06 mm, $\omega$=30.97°

| | | | |
|---|---|---|---|
| $r_1 = 9.51696$ (Aspheric) | $d_1 = 2.50000$ | $n_{d1} = 1.74400$ | $\nu_{d1} = 44.78$ |
| $r_2 = 10.52707$ | $d_2 = 1.04033$ | | |
| $r_3 = -15.46041$ (DIFFR. SF) | $d_3 = 0.00000$ | $n_{d2} = 1001$ | $\nu_{d2} = -3.45$ |
| $r_4 = -15.45937$ | $d_4 = 0.10000$ | $n_{d3} = 1.52288$ | $\nu_{d3} = 52.50$ |
| $r_5 = -15.45937$ | $d_5 = 3.00000$ | $n_{d4} = 1.80440$ | $\nu_{d4} = 39.59$ |
| $r_6 = -13.67783$ | $d_6 = 1.00000$ | | |
| $r_7 = \infty$ (Stop) | | | |

Aspherical Coefficients 1 st surface
K=0.1880
$A_4=-7.5555\times10^{-5}$
$A_6=4.2084\times10^{-6}$
$A_8=-2.6452\times10^{-7}$
$A_{10}=4.4126\times10^{-9}$
3 rd surface
K=0.4814
$A_4=1.6249\times10^{-5}$
$A_6=7.4952\times10^{-8}$
$A_8=1.4691\times10^{-9}$
$A_{10}=-3.6227\times10^{-11}$

EXAMPLE 9 f=36.06 mm, $F_{NO}$=8.0, $f_B$=32.81 mm, $\omega$=29.83°

| | | | |
|---|---|---|---|
| $r_1 = \infty$ (Stop) | $d_1 = 0.50000$ | | |
| $r_2 = 7.57760$ (Aspheric) | $d_2 = 2.46929$ | $n_{d1} = 1.52542$ | $\nu_{d1} = 55.78$ |
| $r_3 = 15.05913$ | $d_3 = 0.00000$ | $n_{d2} = 1001$ | $\nu_{d2} = -3.45$ |
| $r_4 = 15.06001$ (DIFFR. SF) | $d_4 = 1.35207$ | | |
| $r_5 = -4.28197$ | $d_5 = 1.99511$ | $n_{d3} = 1.52542$ | $\nu_{d3} = 55.78$ |
| $r_6 = -5.43794$ (Aspheric) | | | |

Aspherical Coefficients 2 nd surface
K=0
$A_4=6.2449\times10^{-4}$
$A_6=2.7831\times10^{-5}$
$A_8=-2.3513\times10^{-7}$
$A_{10}=3.0083\times10^{-7}$
4 th surface
K=0
$A_4=1.3125\times10^{-7}$
$A_6=-8.8085\times10^{-9}$
$A_8=-1.3059\times10^{-9}$
$A_{10}=1.5398\times10^{-10}$
6 th surface
K=0
$A_4=4.0201\times10^{-4}$
$A_6=4.0097\times10^{-5}$
$A_8=-9.8937\times10^{-7}$
$A_{10}=1.7083\times10^{-7}$

EXAMPLE 10 f=36.14 mm, $F_{NO}$=8.0, $f_B$=33.18 mm, $\omega$=29.98°

| | | | |
|---|---|---|---|
| $r_1 = \infty$ (Stop) | $d_1 = 0.50000$ | | |
| $r_2 = 7.87896$ (Aspheric) | $d_2 = 2.38715$ | $n_{d1} = 1.63854$ | $\nu_{d1} = 55.38$ |
| $r_3 = 20.16269$ | $d_3 = 0.93137$ | | |
| $r_4 = -5.56618$ (DIFFR. SF) | $d_4 = 0.00000$ | $n_{d2} = 1001$ | $\nu_{d2} = -3.45$ |
| $r_5 = -5.56608$ | $d_5 = 0.10000$ | $n_{d3} = 1.52288$ | $\nu_{d3} = 52.50$ |
| $r_6 = -5.56608$ | $d_6 = 2.60967$ | $n_{d4} = 1.74950$ | $\nu_{d4} = 35.27$ |
| $r_7 = -8.18851$ (Aspheric) | | | |

Aspherical Coefficients 2 nd surface

K=0

$A_4=5.8651\times10^{-4}$ $A_6=2.3985\times10^{-5}$ $A_8=2.0588\times10^{-6}$ $A_{10}=6.2312\times10^{-10}$ 4 th surface

K=0

$A_4=-7.5180\times10^{-8}$ $A_6=6.3634\times10^{-10}$ $A_8=6.5392\times10^{-10}$ $A_{10}=-2.2491\times10^{-10}$ 7 th surface

K=0

$A_4=3.4101\times10^{-4}$ $A_6=2.2906\times10^{-5}$ $A_8=-2.7705\times10^{-7}$ $A_{10}=3.6877\times10^{-8}$

EXAMPLE 11 f=35.91 mm, $F_{NO}$=8.0, $f_B$=21.52 mm, $\omega$=30.30°

| | | | |
|---|---|---|---|
| $r_1 = 7.05746$ (Aspheric) | $d_1 = 2.30000$ | $n_{d1} = 1.49241$ | $\nu_{d1} = 57.66$ |
| $r_2 = 14.08423$ | $d_2 = 0.00000$ | $n_{d2} = 1001$ | $\nu_{d2} = -3.45$ |
| $r_3 = 14.08473$ (DIFFR. SF) | $d_3 = 2.29582$ | | |
| $r_4 = \infty$ (Stop) | $d_4 = 4.48559$ | | |
| $r_5 = -10.25229$ (Aspheric) | $d_5 = 4.50403$ | $n_{d3} = 1.58423$ | $\nu_{d3} = 30.49$ |
| $r_6 = -15.83454$ (Aspheric) | | | |

Aspherical Coefficients 1 st surface

K=0

$A_4=-2.3262\times10^{-5}$ $A_6=8.1332\times10^{-7}$ $A_8=-6.2628\times10^{-8}$ $A_{10}=1.5511\times10^{-9}$ 5 th surface

K=0.2201

$A_4=-5.2563\times10^{-4}$ $A_6=-7.8289\times10^{-5}$ $A_8=5.5639\times10^{-6}$ $A_{10}=-2.4568\times10^{-7}$ 6 th surface

K=0

$A_4=-1.3974\times10^{-4}$ $A_6=-8.0349\times10^{-6}$ $A_8=1.9598\times10^{-7}$ $A_{10}=-2.8489\times10^{-9}$

EXAMPLE 12 f=36.06 mm, $F_{NO}$=8.0, $f_B$=34.03 mm, $\omega$=31.96°

| | | | |
|---|---|---|---|
| $r_1 = \infty$ (Stop) | $d_1 = 1.00000$ | | |
| $r_2 = 10.03481$ (Aspheric) | $d_2 = 3.20127$ | $n_{d1} = 1.58423$ | $\nu_{d1} = 30.49$ |
| $r_3 = 7.76426$ | $d_3 = 0.00000$ | $n_{d2} = 1001$ | $\nu_{d2} = -3.45$ |
| $r_4 = 7.76443$ (DIFFR. SF) | $d_4 = 1.47535$ | | |
| $r_5 = -33.63417$ | $d_5 = 3.65580$ | $n_{d3} = 1.72916$ | $\nu_{d3} = 54.68$ |
| $r_6 = -13.04871$ (Aspheric) | | | |

Aspherical Coefficients 2 nd surface

K=0

$A_4=-1.4407\times10^{-4}$ $A_6=4.1761\times10^{-6}$ $A_8=1.7471\times10^{-7}$ $A_{10}=-9.7508\times10^{-8}$ 4 th surface

K=0

$A_4=-3.4278\times10^{-8}$ $A_6=2.0277\times10^{-8}$ $A_8=-1.9875\times10^{-9}$ $A_{10}=5.6037\times10^{-11}$ 6 th surface

K=0

$A_4=-9.9931\times10^{-5}$ $A_6=-4.8519\times10^{-6}$ $A_8=1.0625\times10^{-7}$ $A_{10}=-6.0450\times10^{-9}$

EXAMPLE 13 f=36.10 mm, $F_{NO}$=8.0, $f_B$=35.68 mm, $\omega$=32.33°

| | | | |
|---|---|---|---|
| $r_1 = \infty$ (Stop) | $d_1 = 1.00000$ | | |
| $r_2 = 6.35269$ (Aspheric) | $d_2 = 1.39370$ | $n_{d1} = 1.67270$ | $\nu_{d1} = 32.10$ |
| $r_3 = 4.91600$ (Aspheric) | $d_3 = 1.80000$ | | |
| $r_4 = -30.98742$ (DIFFR. SF) | $d_4 = 0.00000$ | $n_{d2} = 1001$ | $\nu_{d2} = -3.45$ |
| $r_5 = -30.98563$ | $d_5 = 0.10000$ | $n_{d3} = 1.52288$ | $\nu_{d3} = 52.50$ |
| $r_6 = -30.98563$ | $d_6 = 1.83346$ | $n_{d4} = 1.60311$ | $\nu_{d4} = 60.64$ |
| $r_7 = -9.42965$ (Aspheric) | | | |

Aspherical Coefficients 2 nd surface

K=0

$A_4=-8.9798\times10^{-4}$ $A_6=-4.1523\times10^{-5}$ $A_8=4.5065\times10^{-6}$ $A_{10}=-5.8311\times10^{-7}$ 3 rd surface

K=0

$A_4=-1.1345\times10^{-3}$ $A_6=-8.8333\times10^{-6}$ $A_8=-4.1509\times10^{-6}$ $A_{10}=-8.4669\times10^{-8}$ 7 th surface

K=0

$A_4=-2.8189\times10^{-4}$
$A_6=-2.7086\times10^{-5}$
$A_8=1.4981\times10^{-6}$
$A_{10}=-9.5050\times10^{-8}$

EXAMPLE 14 f=28.40 mm, $F_{NO}$=8.0, $f_B$=27.99 mm, ω=39.53°

| | | | |
|---|---|---|---|
| $r_1$ = 10.25543 (Aspheric) | $d_1$ = 7.83781 | $n_{d1}$ = 1.58423 | $v_{d1}$ = 30.49 |
| $r_2$ = 5.62830 | $d_2$ = 8.99453 | | |
| $r_3$ = ∞ (Stop) | $d_3$ = 0.74914 | | |
| $r_4$ = 94.91775 (DIFFR. SF) | $d_4$ = 0.00000 | $n_{d2}$ = 1001 | $v_{d2}$ = -3.45 |
| $r_5$ = 94.95548 | $d_5$ = 16.43054 | $n_{d3}$ = 1.52542 | $v_{d3}$ = 55.78 |
| $r_6$ = -11.73144 (Aspheric) | | | |

Aspherical Coefficients
1 st surface
K=0
$A_4$ 1.3631×10$^{-5}$
$A_6$ 1.4664×10$^{-8}$
$A_8$=-1.5347×10$^{-9}$
$A_{10}$=1.3247×10$^{-11}$
6 th surface
K=0
$A_4$=9.1625×10$^{-5}$
$A_6$=-1.5954×10$^{-7}$
$A_8$=5.2916×10$^{-9}$
$A_{10}$=4.1098×10$^{-12}$

EXAMPLE 15 f=28.49 mm, $F_{NO}$=8.0, $f_B$=24.33 mm, ω=38.84°

| | | | |
|---|---|---|---|
| $r_1$ = 7.63416 (Aspheric) | $d_1$ = 3.33983 | $n_{d1}$ = 1.58423 | $v_{d1}$ = 30.49 |
| $r_2$ = 5.17443 | $d_2$ = 0.00000 | $n_{d2}$ = 1001 | $v_{d2}$ = -3.45 |
| $r_3$ = 5.17454 (DIFFR. SF) | $d_3$ = 1.13367 | | |
| $r_4$ = -52.74007 | $d_4$ = 2.20000 | $n_{d3}$ = 1.67790 | $v_{d3}$ = 55.34 |
| $r_5$ = -9.91155 (Aspheric) | $d_5$ = 1.00000 | | |
| $r_6$ = ∞ (Stop) | | | |

Aspherical Coefficients
1 st surface
K=0
$A_4$=-3.2760×10$^{-4}$
$A_6$=-4.8325×10$^{-6}$
$A_8$=-5.6482×10$^{-7}$
$A_{10}$=-3.3557×10$^{-9}$
3 rd surface
K=0
$A_4$=-1.3215×10$^{-7}$
$A_6$=7.6302×10$^{-8}$
$A_8$=-1.1646×10$^{-8}$
$A_{10}$=6.3223×10$^{-10}$
5 th surface
K=0
$A_4$=-5.1452×10$^{-4}$
$A_6$=-1.0559×10$^{-5}$
$A_8$=-1.5190×10$^{-6}$
$A_{10}$=-6.5933×10$^{-10}$

EXAMPLE 16 f=36.10 mm, $F_{NO}$=8.0, $f_B$=32.90 mm, ω=32.38°

| | | | |
|---|---|---|---|
| $r_1$ = 10.03645 (Aspheric) | $d_1$ = 3.91802 | $n_{d1}$ = 1.60342 | $v_{d1}$ = 38.01 |
| $r_2$ = 6.33133 (Aspheric) | $d_2$ = 1.60282 | | |
| $r_3$ = -53.44303 (DIFFR. SF) | $d_3$ = 0.00000 | $n_{d2}$ = 1001 | $v_{d2}$ = -3.45 |
| $r_4$ = -53.43722 | $d_4$ = 2.84551 | $n_{d3}$ = 1.63854 | $v_{d3}$ = 55.38 |
| $r_5$ = -10.39640 (Aspheric) | $d_5$ = 1.00000 | | |
| $r_6$ = ∞ (Stop) | | | |

Aspherical Coefficients
1 st surface
K=0
$A_4$=-1.6933×10$^{-4}$
$A_6$=-5.5657×10$^{-6}$
$A_8$=-3.6642×10$^{-9}$
$A_{10}$=-1.8218×10$^{-9}$
2 nd surface
K=0
$A_4$6.5371×10$^{-5}$
$A_6$=3.4012×10$^{-6}$
$A_8$=-4.5904×10$^{-7}$
$A_{10}$=6.2789×10$^{-8}$
5 th surface
K=0
$A_4$=-2.8991×10$^{-4}$
$A_6$=-1.6823×10$^{-5}$
$A_8$=9.4645×10$^{-7}$
$A_{10}$=-6.2250×10$^{-8}$ FIGS. 22 to 29 are aberration diagrams showing (a) spherical aberration, (b) astigmatism, (c) distortion, and (d) chromatic aberration of magnification for Examples 1, 5, 7, 9, 11, 12, 14, and 15 with respect to an object point at infinity.

Tabulated below are values of conditions (1) to (8) in the aforesaid examples.

| | (1), (2) | (3), (4) | (5), (6) | (7), (8) |
|---|---|---|---|---|
| Example 1 | 0.080 | 0.054 | — | 0.112 |
| 2 | 0.051 | -0.024 | — | 0.143 |
| 3 | 0.066 | -0.979 | — | 0.142 |
| 4 | 0.208 | -0.217 | — | 0.077 |
| 5 | 0.127 | -0.022 | — | 0.061 |
| 6 | 0.194 | -0.100 | — | 0.084 |
| 7 | 0.186 | -0.381 | — | 0.072 |
| 8 | 0.144 | -0.050 | — | 0.157 |
| 9 | 0.082 | — | -0.381 | 0.140 |
| 10 | 0.106 | — | -0.781 | 0.117 |
| 11 | 0.064 | — | -0.507 | 0.091 |
| 12 | 0.117 | — | -0.205 | 0.102 |
| 13 | 0.116 | — | -0.681 | 0.067 |
| 14 | 0.026 | — | -0.499 | 0.086 |
| 15 | 0.152 | — | -0.419 | 0.117 |
| 16 | 0.107 | — | -0.765 | 0.073 |

As can be seen from the foregoing explanation, a high-performance optical system which, albeit being composed of a reduced number of lenses, is well corrected for chromatic aberrations can be achieved by proper use of diffractive surfaces, whereby a high-performance phototaking optical system used on cameras, etc. can be provided at low cost.

What we claim is:

1. A phototaking optical system making use of a diffractive optical element, which comprises an aperture stop, at least two lenses having at least one diffractive surface, and satisfies the following condition (1):

$$0 < d_{DOE}/f < 0.24 \tag{1}$$

where f is a focal length of the overall phototaking optical system, and $d_{DOE}$ is a distance on an optical axis of the phototaking optical system from the aperture stop to the diffractive surface.

2. A phototaking optical system according to claim 1, wherein said at least two lenses are the only lenses in said phototaking optical system.

3. A phototaking optical system making use of a diffractive optical element, which comprises an aperture stop, one positive lens and another positive lens in order from an object side of the phototaking optical system, at least one of said lenses having at least one diffractive surface, and both said lenses being formed of a homogeneous medium.

4. A phototaking optical system making use of a diffractive optical element, which comprises an aperture stop, one positive lens and another positive lens in order from an object side of the phototaking optical system and at least one diffractive surface, and satisfies the following condition (3):

$$-1 < SF_1 < 0.15 \tag{3}$$

where $SF_1 = (r_A - r_B)/(r_A + r_B)$ wherein $r_A$ is a radius of curvature of a surface of the first lens that faces the object side, and $r_B$ is a radius of curvature of a surface of the first lens that faces an image side of the phototaking optical system.

5. A phototaking optical system making use of a diffractive optical element, which comprises an aperture stop, one negative lens and one positive lens in order from an object side of the phototaking optical system, at least one of said lenses having at least one diffractive surface.

6. A phototaking optical system according to claim 5, which satisfies the following condition (5):

$$-1.2 < f/f_{NEG} < -0.05 \tag{5}$$

where f is a focal length of the overall phototaking optical system and $f_{NEG}$ is a focal length of the negative lens.

7. A phototaking optical system according to claim 5, wherein at least one of said lenses has an aspheric surface in addition to the at least one diffractive surface.

8. A phototaking optical system according to claim 2 or 3, wherein the aperture stop is located on a side of an arrangement consisting of the two lenses that faces the object side of the phototaking optical system.

9. A phototaking optical system according to claim 2 or 3, wherein the aperture stop is located between the two lenses.

10. A phototaking optical system according to claim 2 or 3, wherein the aperture stop is located on a side of an arrangement consisting of the two lenses that faces the image side of the phototaking optical system.

11. A phototaking optical system according to claim 1 or 4, which includes only one diffractive surface.

12. A phototaking optical system according to claim 1 or 3, wherein the diffractive surface is formed on a curved lens surface.

13. A phototaking optical system according to claim 1 or 3, wherein both the lenses are formed of a homogeneous medium.

14. A phototaking optical system according to claim 1 or 3, wherein the diffractive surface has a positive power.

15. A phototaking optical system according to claim 14, wherein the diffractive surface satisfies the following condition (7):

$$0.02 < f/f_{DOE} < 0.5 \tag{7}$$

where f is a focal length of the overall phototaking optical system and $f_{DOE}$ is a power of the diffractive surface.

16. A phototaking optical system according to claim 1 or 3, which satisfies the following condition (9):

$$470 \text{ nm} < \lambda_{DOE} < 550 \text{ nm} \tag{9}$$

where $\lambda_{DOE}$ is a design wavelength at which a maximum diffraction efficiency is obtained.

17. A phototaking optical system making use of a diffractive optical element, which comprises an aperture stop, one positive lens and one negative lens in order from an object side of the phototaking optical system, at least one of said lenses having at least one diffractive surface, wherein said phototaking optical system satisfies the following condition (5):

$$-1.2 < f/f_{NEG} < -0.05 \tag{5}$$

where f is a focal length of the overall phototaking optical system and $f_{NEG}$ is a focal length of the negative lens.

18. A phototaking optical system making use of a diffractive optical element, which comprises an aperture stop, one positive lens and one negative lens in order from an object side of the phototaking optical system, at least one of said lenses having a diffractive surface, and at least one of said lenses having an aspheric surface.

19. A phototaking optical system making use of a diffractive optical element, which comprises an aperture stop and two lenses, at least one of said lenses having a diffractive surface, wherein the aperture stop is located between the two lenses.

20. A phototaking optical system making use of a diffractive optical element, which comprises an aperture stop and two lenses, at least one of said lenses having a diffractive surface, wherein the aperture stop is located on a side of an arrangement consisting of the two lenses that faces the image side of the phototaking optical system.

21. A phototaking optical system making use of a diffractive optical element, which comprises an aperture stop and two lenses, at least one of said lenses having a diffractive surface, wherein the diffractive surface is formed on a curved lens surface.

22. A phototaking optical system making use of a diffractive optical element, which comprises an aperture stop and two lenses, at least one of said lenses having a diffractive surface, wherein the diffractive surface has positive power.

23. A phototaking optical system making use of a diffractive optical element, which comprises an aperture stop and two lenses, at least one of said lenses having a diffractive surface, which satisfies the following condition (9):

$$470 \text{ nm} < \lambda_{DOE} < 550 \text{ nm} \tag{9}$$

where $\lambda_{DOE}$ is a design wavelength at which a maximum diffraction efficiency is obtained.

24. A phototaking optical system making use of a diffractive optical element according to claim 19 or 20, wherein said two lenses are the only lenses in said phototaking optical system.

25. A phototaking optical system according to claim 22, wherin the diffractive surface satisfies the following condition (7):

$$0.02 < f/f_{DOE} < 0.5 \tag{7}$$

where f is a focal length of the overall phototaking optical system and $f_{DOE}$ is a power of the diffractive surface.

* * * * *